United States Patent
Azizi et al.

(10) Patent No.: US 9,294,145 B2
(45) Date of Patent: Mar. 22, 2016

(54) METHODS AND ARRANGEMENTS FOR VERY LARGE BANDWIDTH OPERATIONS

(71) Applicant: Intel Corporation, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 14/229,891

(22) Filed: Mar. 29, 2014

(65) Prior Publication Data

US 2015/0280777 A1 Oct. 1, 2015

(51) Int. Cl.
| | |
|---|---|
| H04W 4/00 | (2009.01) |
| H04B 1/7143 | (2011.01) |
| H04W 72/04 | (2009.01) |
| H04W 88/06 | (2009.01) |
| H04L 1/16 | (2006.01) |

(52) U.S. Cl.
CPC ............ *H04B 1/7143* (2013.01); *H04L 1/1607* (2013.01); *H04W 72/0446* (2013.01); *H04W 72/0453* (2013.01); *H04W 88/06* (2013.01)

(58) Field of Classification Search
USPC ......... 370/330, 310, 319, 338, 343, 328, 252, 370/468, 466, 329, 335; 375/133, 135, 132, 375/130; 455/450, 452
See application file for complete search history.

(56) References Cited

U.S. PATENT DOCUMENTS

| | | | | |
|---|---|---|---|---|
| 6,256,334 B1 * | 7/2001 | Adachi | ................ | H04B 1/7143 370/252 |
| 2006/0029018 A1 * | 2/2006 | Mizukami | ............ | H04B 1/7156 370/328 |

* cited by examiner

*Primary Examiner* — Chi H Pham
*Assistant Examiner* — Alexander O Boakye
(74) *Attorney, Agent, or Firm* — Schubert Law Group PLLC

(57) ABSTRACT

Logic may determine a first frame comprising a hopping pattern value and a target hopping time (THT). The hopping pattern may indicate a pattern of channels to which to hop. Logic may determine a clear-to-send (CTS) frame comprising a duration value indicative of a duration of a data transmission. Logic may transmit the first frame on at least a primary channel of the channels. Logic may transmit the CTS frame prior to transmitting the data transmission on the one or more channels in accordance with the hopping pattern, each channel having a bandwidth of at least 450 megahertz and being within in a 6 gigahertz to 10 gigahertz frequency band. Logic may receive a frame on at least a primary channel of the channels. Logic may receive CTS frames at the THT in accordance with the hopping pattern.

25 Claims, 12 Drawing Sheets

US 9,294,145 B2

METHODS AND ARRANGEMENTS FOR VERY LARGE BANDWIDTH OPERATIONS

TECHNICAL FIELD

Embodiments are in the field of wireless communications. More particularly, embodiments may involve implementing frequency hopping to implement a very large bandwidth for communications.

BACKGROUND

A wireless communications system may utilize bi-directional signaling of control information to coordinate operations between geographically disparate communications devices. As a way to further evolve Wi-Fi (wireless fidelity) communications, there has been activity to make new frequency bands available in which Wi-Fi can be deployed. Two such bands include additional bandwidth in the 5 GHz band and 6-10 GHz bands. The Federal Communications Commission (FCC) announced this band was available for ultra-wideband use in 2002. The attractiveness to the band is that there is 3 GHz of contiguous bandwidth available globally. Other systems have attempted to use the band that withdrew or has had minimal market deployment. Thus, the spectrum is currently underutilized.

BRIEF DESCRIPTION OF THE DRAWINGS

FIG. 1I depicts an embodiment of CTS transmissions followed by data transmissions on five of the six contiguous sub-channels due to a busy sub-channel during the CTS transmissions;

DETAILED DESCRIPTION OF EMBODIMENTS

Figure 1:
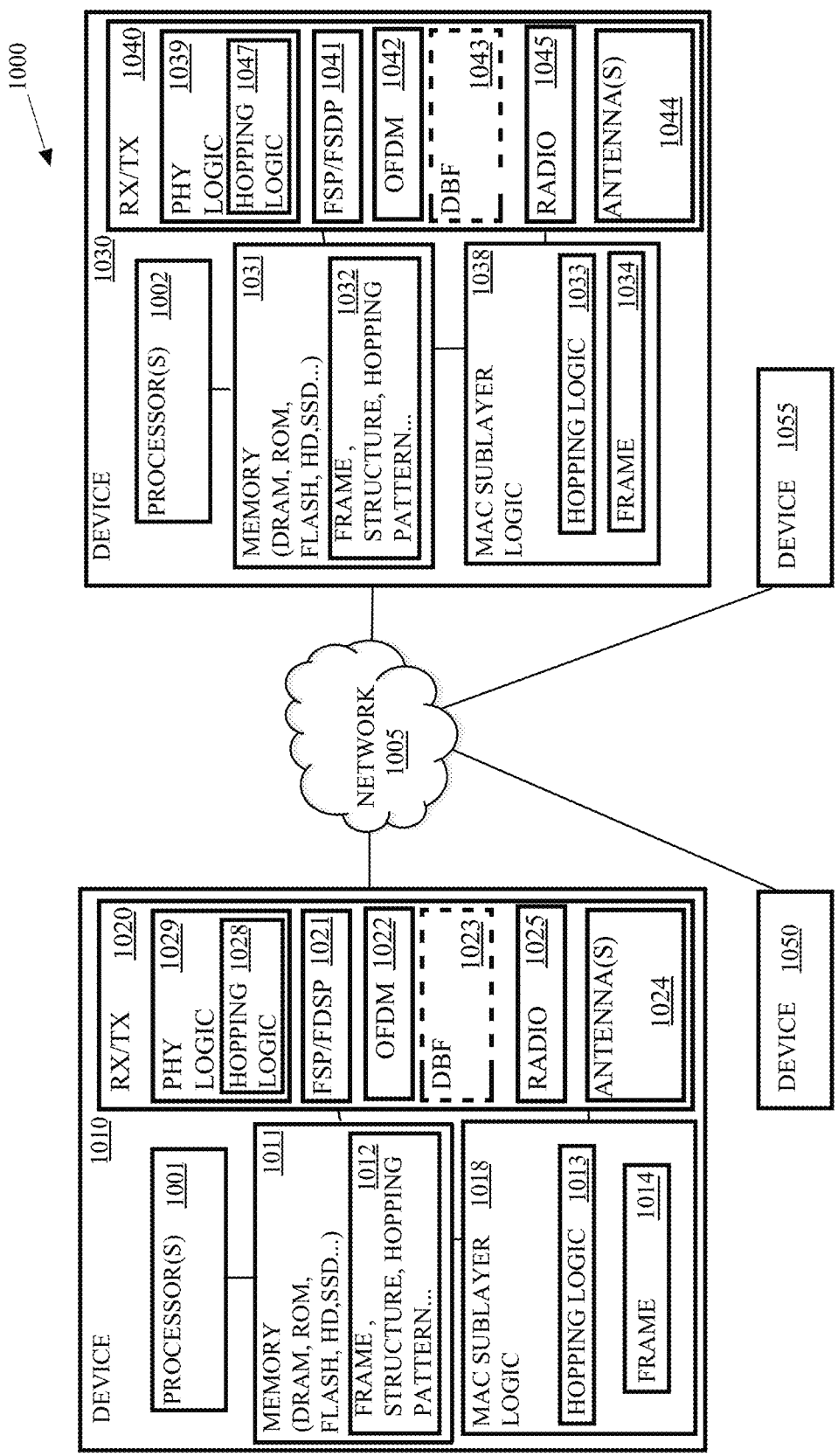
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments may increase the transmission range of Wi-Fi (Wireless Fidelity) communications. Many embodiments focus on a 3 Gigahertz (GHz) bandwidths in 6-10 GHz. However, the embodiments are not limited to the bandwidths and frequency bands described herein.

A design issue related to usage of the 3 GHz bandwidth is a very restrictive power spectral density defined for the 6-10 GHz range as −41.3 decibel-milliwatt per Megahertz (dBm/MHz). Such power spectral density offers a short range but increasing the bandwidth utilized can increase the transmission range in many embodiments. One way to increase the utilized bandwidth is to implement a frequency hopping pattern that crosses, e.g., the 3 GHz bandwidth.

Several embodiments implement 80 MHz or 160 MHz bandwidth specifications of IEEE 802.11ac as frequency segments. In several embodiments, these frequency segments are used as building blocks to generate large bandwidth transmissions in multiples of 80 MHz and/or 160 MHz such as 450 MHz or 480 MHz bandwidths (500 MHz with guard tones). The 80 MHz or 160 MHz frequency segment may comprise the same subcarrier structure as the corresponding IEEE 802.11ac bandwidths. For example, in the 160 MHz bandwidth frequency segment, there are a total of 468 data subcarriers and 16 pilot subcarriers specified in IEEE 802.11ac. Thus, in this example with three—160 MHz subbands to create a contiguous 480 MHz bandwidth communication, there are a total of 1404 data subcarriers in addition to 48 pilot subcarriers.

For some embodiments that implement a contiguous bandwidth, the subcarriers may be mapped to each of the three 160 MHz bands (for a total of 480 MHz) using a mapping function to a discrete Fourier transform module. Other embodiments may use 80 MHz frequency segments as the primary building block, or a mix of both 160 MHz and 80 MHz bandwidth frequency segments to create a larger bandwidth.

Several embodiments may divide the 3 GHz bandwidth into six 500 MHz channels. Hopping frequencies between three channels with 480 MHz bandwidth communications can gain 4.7 dBm in transmission power and, thus, extend the transmission range. Hopping frequencies over six of the channels can provide a gain of 7.8 dBm in transmission power.

Further embodiments may implement non-contiguous bandwidths in multiples of 80 MHz or 160 MHz and totaling 500 MHz with guard tones. For instance, one embodiment may implement six non-contiguous, 80 MHz bandwidth transmissions and another embodiment may implement three non-contiguous, 160 MHz bandwidth transmissions. When using any such allocation, the group of signals may then hop to other frequencies in accordance with a hopping pattern to allow the communications device to transmit with higher total power and still meet the United States (US) Federal Communications Commission (FCC) rules. In several embodiments, hopping may also improve system performance by improving frequency diversity.

Many embodiments implement medium access control (MAC) sublayer logic, also referred to as MAC logic, which enables transmission of such frequency hopping waveforms. Using this MAC logic, transmission of frequency-hopped signals will be possible while maintaining the underlying 802.11 carrier sense multiple access with collision avoidance (CSMA/CA) mechanism. By doing so, overall system performance will improve because of, e.g., (1) increasing the total transmit power while it still meets United States Federal Communication Commission (FCC) rules, and (2) exploiting frequency diversity that is resulted from frequency hopping.

In some embodiments, the MAC logic may select a predetermined hopping pattern that the physical layer (PHY) logic is designed to or configured to implement. The predetermined hopping pattern may be referred to by a hopping pattern value known to capable devices and may indicate a pattern of channels to which to hop to receive frame transmissions.

In several embodiments, the MAC logic may determine or decode a first frame comprising a hopping pattern value and a target hopping time (THT) depending upon whether the MAC logic is receiving a transmission or sending a transmission. In some embodiments, the first frame may be a beacon frame transmitted by an access point. In many embodiments, the beacon frame may transmit on a channel designated as the primary channel with the lowest modulation and coding scheme (MCS0), which is the most robust MCS. In further embodiments, the first frame may be another type of frame transmitted from a station other than an access point to initiate a transmission with an access point or with another station using frequency hopping. The THT may be a relative time at which the MAC logic will begin transmitting control frames such as clear-to-send (CTS) or ready-to-send RTS frames to reserve one or more of the sub-channels for a data transmission. And the MAC logic may determine the control frames comprising a duration value indicative of a duration of the data transmission.

In many embodiments, the MAC logic couples with a PHY device to instruct the PHY device to transmit frames or receive frames in accordance with a selected hopping pattern. The PHY device may transmit the first frame on at least a primary channel of the sub-channels. Note that sub-channels are referred to as channels or sub-channels interchangeably herein. Also note that when the descriptions discuss transmitting a frame, the term "frame" is referring to a MAC level frame for implementing the embodiments described herein unless the frame is specifically designated as a PHY frame. MAC frames are, in many embodiments, converted to MAC protocol data units that are passed to the PHY and the PHY typically creates a PHY protocol data unit (PPDU) to transmit. So reference to transmitting a frame implies any inherent conversion of the frame necessary for transmission in the particular embodiment.

The PHY device may comprise PHY logic to interpret the instructions from the MAC logic and to transmit or receive the control frames on one or more of the channels in accordance with the hopping pattern prior to transmitting/receiving the data transmission on the one or more of the channels.

The PHY device may transmit the frames comprising the hopping pattern value and THT in accordance with instructions from the MAC logic, which may involve transmitting the frames on the primary channel and/or other channels, transmitting frames on each of the channels sequentially, or transmitting the frames as a wideband transmission across all or more than one of the channels at the same time. And the PHY device may transmit a series of the frames on the primary channel interlaced with wideband transmissions of the frames.

The MAC logic may skip usage of a channel for a data transmission if that channel is busy while attempting to reserve the channel with a control frame such as a self-CTS and MAC logic in receiving devices may include a protocol to skip usage of the channel if the control frame is not received on the channel.

After transmission/receipt of data packets in a data transmission, the MAC logic may transmit and receive acknowledgements of data transmissions on one or more of the sub-channels with an immediate acknowledgement, a series of delayed acknowledgements, or block acknowledgement.

In further embodiments, the geographical region in which a communications device is deployed or installed, the hardware capabilities of the communications device, and/or other factors, may determine the hopping pattern, hopping frequency, and/or trigger event for hopping between frequencies in the, e.g., 3 GHz bandwidth. Note that embodiments are not limited to a 3 GHz bandwidth and are not limited to a bandwidth in the 6 GHz to 10 GHz frequency bands.

Various embodiments may be designed to address different technical problems associated with transmitting or receiving communications with an increased transmission range across a large bandwidth with a restrictive power spectrum density. Other technical problems may include transmitting or receiving communications with an increased transmission range that comprises a large bandwidth hopping across frequency channels, communicating a hopping pattern, communicating a start of a transmission with frequency hopping, communicating a duration a data transmission on the on the channels of the large bandwidth, acknowledging a data transmission on the channels, encountering one or more busy channels during reservation of the channels, transmitting or receiving communications with an increased transmission range that comprises a 450 or 480 MHz bandwidth hopping across frequency channels totaling 3 GHz in 6 GHz to 10 GHz frequency bands, generating a communication with a contiguous bandwidth of 480 MHz, generating a communication with a non-contiguous bandwidth of 480 MHz, receiving a communication with a contiguous bandwidth of 480 MHz, receiving a communication with a non-contiguous bandwidth of 480 MHz, and/or the like.

Different technical problems such as those discussed above may be addressed by one or more different embodiments. For instance, some embodiments that address transmitting or receiving communications with an increased transmission range across a large bandwidth with a restrictive power spectrum density may do so by one or more different technical means such as transmitting or receiving a frame with a hopping pattern value, transmitting or receiving a frame with a target hopping time, transmitting or receiving a frame such as a control frame with a duration that is indicative of a duration of a data transmission on the on the channels of the large bandwidth, transmitting or receiving an immediate acknowledgement on the channels on which data is transmitted, transmitting or receiving delayed acknowledgements to acknowledge receipt of data transmissions on each of the channels, transmitting or receiving a block acknowledgement to acknowledge receipt of data transmissions on all of the channels, skipping usage of a busy channel in a hopping pattern, transmitting or receiving communications that hop across frequency channels of a large bandwidth in response to trigger events, transmitting or receiving communications with an increased transmission range that hops frequency channels across a large bandwidth such as a 3 GHz bandwidth, generating a communication with a contiguous or non-contiguous bandwidth based upon frequency segments of 80 MHz and/or 160 MHz at different carrier frequencies, determining a channel hopping pattern, hopping channels after each link transmission, hopping channels after a fixed time interval, and/or the like.

Some embodiments implement Institute of Electrical and Electronic Engineers (IEEE) 802.11 systems such as IEEE 802.11ac systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi", or wireless fidelity). In one embodiment, for example, an improved acknowledgement scheme may be implemented for a WLAN such as the IEEE 802.11ac wireless communications standard. The embodiments, however, are not limited to this example.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

This disclosure is not limited to WLAN related standards, but may also apply to wireless wide area networks (WWANs) and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The examples are not limited in this context.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a consumer electronics device, a personal mobile device, or the like. And communications devices 1050 and 1055 may comprise sensors, stations, access points, hubs, switches, routers, computers, laptops, netbooks, cellular phones, smart phones, PDAs, or other wireless-capable devices. Thus, communications devices may be mobile or fixed.

In some embodiments, the communications device 1010 and/or the communication devices 1030, 1050, and 1055 may be built with a System On a Chip (SOC). An SOC may be an integrated circuit (IC) that integrates all or many components of a communications device or other electronic system into a single chip. The SOC may contain digital, analog, mixed-signal, and often radio-frequency functions on a single chip substrate. In many embodiments, the SOC may comprise all the components of the communications device 1010 and or the communications device 1030 with the exception of the antennas. In several embodiments, each SOC may comprise one or more radios such as radio 1025 and/or radio 1045. And, in many embodiments, systems such as system 1000 may couple one or more antennas or antenna arrays such as antenna arrays 1024 and/or 1044 with each of the one or more radios on the SOC.

Initially, the communications device 1030 may determine a frame 1034 to transmit. In some embodiments, the communications device 1030 may receive a data packet and determine to respond with an, e.g., null data packet acknowledgement, and, in other embodiments, the communications device 1030 may determine to contact the communications device 1010 with a probe request, an association request, or the like.

In the present embodiment, the communications device 1030 received a beacon frame 1014 from the communications device 1010 and thereafter associated with the communications device 1010. The beacon frame 1014 comprises capabilities of the communications device 1010 and may comprise a capabilities field including an indication of frequency hopping patterns that the communications device 1010 is capable of implementing. FIG. 1B illustrates an embodiment of a frame 1200 such as a beacon frame 1014 that can comprise a capabilities field in, e.g., the frame body 1208.

The frame 1200 may comprise all the fields of the standard frame, truncated or compressed fields, or a select set of fields. In the embodiment illustrated in FIG. 1A, the frame 1200 comprises a MAC header 1212 followed by a frame body field 1208 and a frame check sequence (FCS) field 1210. The frame body field 1208 may comprise one or more frames also referred to as MAC sublayer Service Data Units (MSDUs). The frame body 1208 may be a variable number of octets such as zero to 2312 octets like a frame body of a standard frame and may include data elements, control elements, or parameters and capabilities. A capabilities field in the beacon frame from the communications device 1010 may indicate that any of the frequency hopping patterns included in the table 1100 of FIG. 1A and/or other frequency hopping patterns are within the capabilities of the communications device 1010.

The FCS field 1210 may be four octets such as the standard frame and may include extra checksum characters added to the frame 1200 for error detection and correction.

The MAC header 1212 may comprise the frame control field 1202, a duration/identifier (DUR/ID) field 1204 and an address (ADDR) field 1206. The frame control field 1202 may be two octets such as the standard frame and may identify the type and subtype of the frame such as a management type and a beacon subtype or a control type and clear-to-send (CTS) subtype. One or more of the fields such as the frame body 1208 may only be present in certain frame types and subtypes.

Figure 1A:
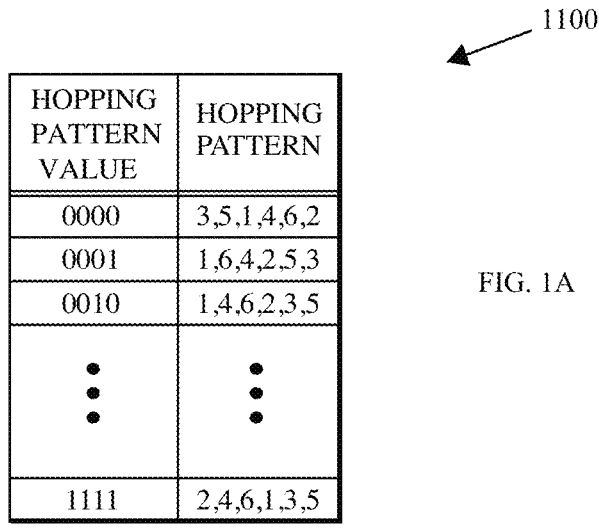
FIG. 1A depicts an embodiment of hopping patterns and corresponding hopping pattern values for multiple systems each with six frequency sub-channels that can be used to indicate a hopping pattern in a frame such as a beacon frame.
Figure 1B:
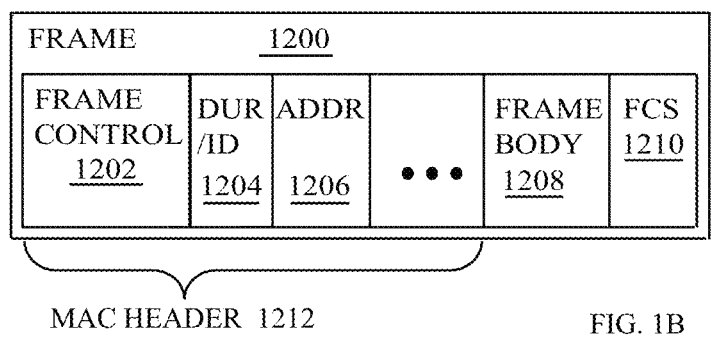
FIG. 1B depicts an embodiment of a frame for transmitting a hopping pattern value and a target hopping time (THT) such as the frames in FIG. 1.

The medium access control (MAC) sublayer logic 1038 may comprise hopping logic 1033 to choose a hopping pattern from a table or other data structure containing hopping patterns in the memory 1032 such as the table 1100 in FIG. 1A. Table 1100 illustrates an example of a hopping pattern table 1100 that includes 16 hopping pattern values, each associated with a different hopping pattern for transmitting a data transmission. Each hopping pattern in the table 1100 such as the pattern "3,5,1,4,6,2" may be identified by the four-bit hopping pattern value such as "0000" in a frame transmitted to another station. The hopping pattern such as "3,5,1,4,6,2" may be as simple as a list of the frequencies in the order in which packets will be transmitted or received. So the pattern "3,5,1,4,6,2" may indicate that the first frequency to receive a packet on is channel 3. The second channel on which to receive a packet is channel 5, and so on to channel 2.

The pattern may then repeat. Patterns are not limited to a particular number of frequencies or listing one of each frequency. In some embodiments, the hopping patterns may include patterns for both contiguous and non-contiguous transmissions.

Figure 1C:
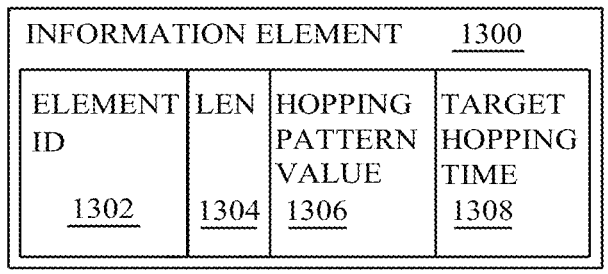
FIG. 1C depicts another embodiment of an information element for transmitting a hopping pattern value and a target hopping time (THT) that can be included in a frame body of a frame such as the frame in FIG. 1B.

The MAC logic 1038 may communicate with the physical layer (PHY) logic 1039 to transmit the frame 1034 to the communications device 1010 including the indication of the hopping pattern value and a target hopping time (THT). In some embodiments, the hopping pattern value and a target hopping time (THT) may be included in a frame such as the frame 1200 in FIG. 1B in the frame body 1208. And, in some of these embodiments, the hopping pattern value and a target hopping time (THT) may be included in an information element that can be included in a frame body 1208 such as the information element 1300 illustrated in FIG. 1C.

The information element 1300 may comprise an element ID field 1302, a length field 1304, a hopping pattern value field 1306, and a target hopping time (THT) field 1308. The element ID field 1302 may include a value that indicates a frequency hopping pattern value and THT information element. The length field 1304 may indicate a length of the information element 1300. The hopping pattern value field 1306 may include a hopping pattern value such as "0001" from the table 1100 in FIG. 1A. And the THT field 1308 may indicate a relative time period that is the time period between the frame 1034 transmission and the transmission of RTS or CTS frames to reserve the channels for a data transmission in accordance with the frequency hopping pattern.

In many embodiments, the PHY logic 1039 may generate a preamble to prepend to the frame prior to transmitting the MAC frame 1034 to the communications device 1010.

The communications device 1010 may comprise hopping logic 1013 to receive, decode, and interpret the frame 1034. In particular, the communications device 1010 may parse the frame 1034 to determine the hopping pattern value and the THT. The hopping logic 1013 may access a data structure of hopping patterns in the memory 1012 such as the table 1100 and use the hopping pattern value as an index to retrieve the hopping frequency pattern.

If, for instance, the hopping pattern value is "1111" then the hopping logic 1013 may retrieve the hopping pattern "2,4,6,1,3,5" from the memory 1011. With this pattern, the hopping logic 1013 may determine that the MAC logic 1018 and PHY device, RX/TX 1020, should prepare to receive a transmission on the second frequency channel, channel 2, at the THT and then to transition to the channel 4 an Interframe Space (IFS) after receipt of a packet on the channel 2.

The MAC logic 1038 may prepare a control frame such as an RTS to transmit to the communications device 1010 on each of the frequency channels 1 through 6 and may instruct the PHY device, RX/TX 1040, to transmit the RTS at the THT in the order of the hopping pattern "2,4,6,1,3,5". In many embodiments, the communications device 1030 may wait a Short Interframe Space (SIFS) between each transmission of an RTS on the channels "2,4,6,1,3,5".

The hopping logic 1013 may receive each of the RTS frames from the communications device 1030 and respond with a CTS on each channel in the same hopping pattern "2,4,6,1,3,5". Based upon the duration value in the last RTS received, the hopping logic 1013 may set a network allocation vector (NAV) timer to indicate the duration of the data transmission from the communications device 1030. Furthermore, hopping logic of the communications devices 1050 and 1055 may receive one or more of the RTS's and set their NAV timers based upon the duration value in the last received RTS. Thereafter, the MAC logic 1038 may transmit data on the channels in the hopping pattern "2,4,6,1,3,5" to the communications device 1010 and the communications device 1010 may acknowledge receipt of the data transmissions.

In some embodiments, the acknowledgement (ACK) policy may be predetermined. In some embodiments, the ACK policy may be based upon capabilities of the communications devices 1010 and 1030. In further embodiments, the communications device 1030 may select an ACK policy based upon the capabilities of the communications device 1010 that is also within the capabilities of the communications device 1030. In the present embodiment, the hopping logic 1033 may be capable of an immediate ACK response that is transmitted a SIFS after receipt of a data transmission on each of the channels and may have indicated such in a management frame transmission such as the frame with the hopping pattern value and the THT. In response, the hopping logic 1013 may transmit an ACK on each of the channels a SIFS after receipt of the data transmission on each of the channel.

In further embodiments, the communications device 1030 may also or alternatively be capable of a block ACK for the data transmissions on the channels and may receive a single block ACK from the communications device 1010 after the communications device 1010 receives all the data transmissions on the channels in accordance with the hopping pattern "2,4,6,1,3,5".

In some embodiments, the packet transmissions may be contiguous and, in further embodiments, the packet transmissions may be non-contiguous. In one embodiment, communications may be a 480-megahertz (MHz) bandwidth transmission within a 6-gigahertz (GHz) to 10 GHz frequency band. For contiguous transmissions, the hopping pattern may comprise a single channel in which to transmit a packet such as one of, e.g., six 500 MHz channels within 3 GHz of contiguous bandwidth. In such embodiments, the hopping pattern may indicate a channel for the entire transmission. In other embodiments, the packet transmissions may be non-contiguous and the hopping pattern may indicate more than one channel in which to transmit a packet.

In several embodiments, the frame 1034 may be transmitted from module to module through the transmitter of the transceiver (RX/TX) 1040 as a data stream to process the packet in preparation for transmission to the communications device 1010. In many embodiments, after encoding the packet, the communications device 1030 may comprise a frequency segment parser/frequency segment deparser (FSP/FSDP) 1041 to parse the encoded PHY frame into two or more frequency segments. Note that FSP/FSDP 1021 may perform the same or similar functionality as FSP/FSDP 1041.

In some embodiments, after receiving the 480 MHz bandwidth signal on a first channel in accordance with the hopping pattern, the hopping logic 1047 of the communications device 1030 and the hopping logic 1028 of the communications device 1010 may determine to hop to the next channel. In other embodiments, the hopping logic 1047 and 1028 may await or determine the occurrence of a different trigger such as a timeout when the hopping logic 1047 and 1028 is waiting for a busy channel to become clear of traffic or for an ACK response. For instance, the trigger may be an acknowledgement response received from the communications device 1010 by the communications device 1030. Thus, after the communications device 1010 transmits an acknowledgement, the hopping logic 1028 may ready the transceiver 1020 for receiving another communication on the subsequent channel in accordance with the hopping pattern. Similarly, after receiving the acknowledgement from the communications device 1010, the hopping logic 1047 may determine that the trigger event occurred to advance to the next channel according to the hopping pattern and may ready the transmitter of the transceiver 1040 of the communications device 1030 to transmit on that next communications channel in the hopping pattern. Note that embodiments that implement the non-contiguous transmissions can afford improved frequency diversity by spreading the waveform over a larger frequency bandwidth than the contiguous transmissions.

Figure 1D:
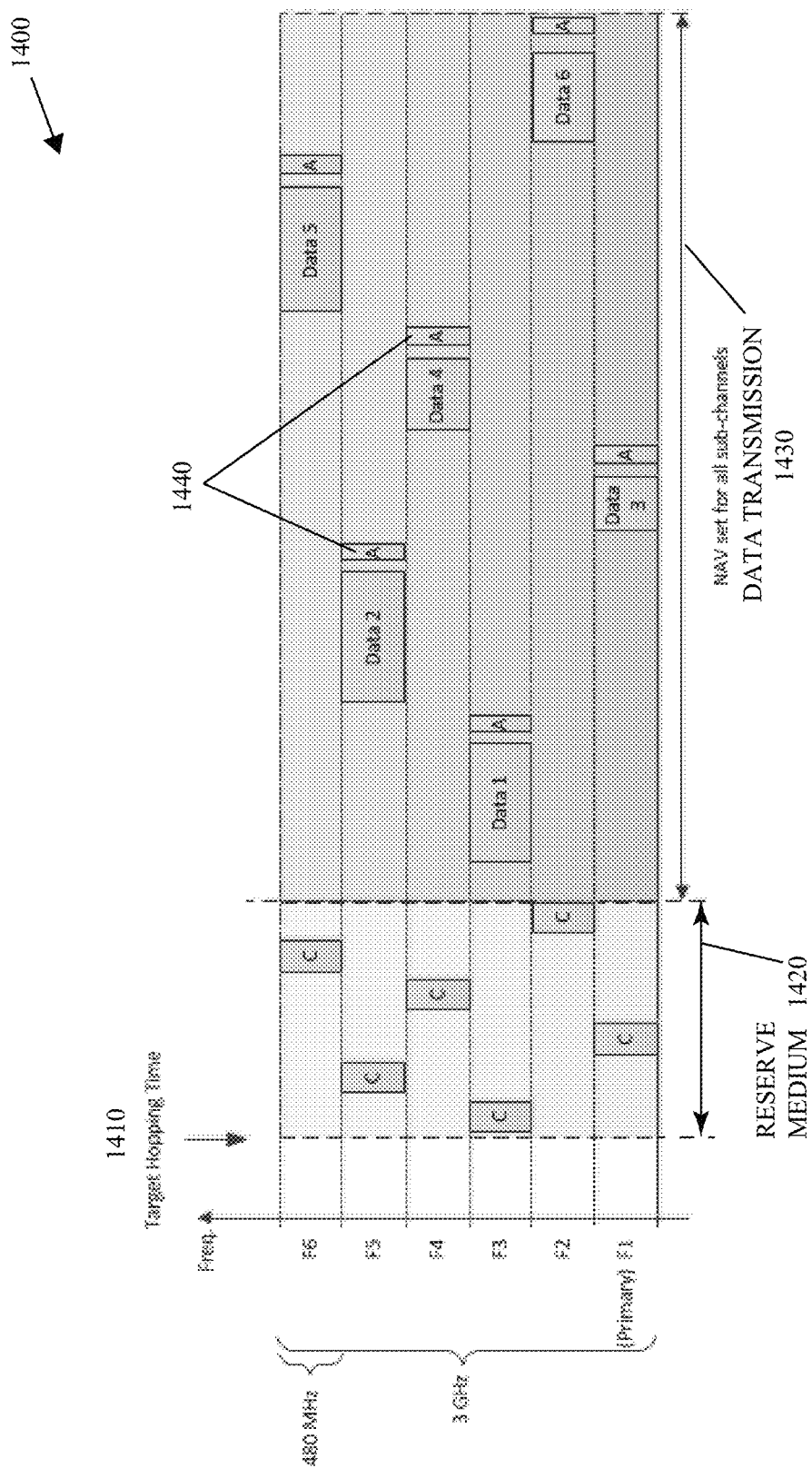
FIG. 1D depicts an embodiment of CTS transmissions followed by data transmissions on six sub-channels with immediate acknowledgements of receipt of the data packets on the same sub-channels as the transmission of the data packets.

Referring to FIG. 1D, there is shown an embodiment of a timing diagram 1400 with time progressing from left to right and six frequency band sub-channels are marked as F1 through F6. In this embodiment, the communications device 1010 may transmit the self-CTS transmissions 1420 followed by data transmissions 1430 on the six sub-channels. Note that the communications device 1010 (an access point) may transmit the self-CTS transmissions according to the same hopping pattern as the data transmissions, Data 1 through Data 6, but prior to the data transmissions to reserve the channels for a duration indicated in the self-CTS frames.

In the present embodiment, the communications device 1030 may respond to each of the data transmissions, Data 1 through Data 6, with immediate ACKs 1440, illustrated as "A", to confirm receipt of the data packets. The immediate ACKs 1440 are transmitted on the same sub-channels as the data transmissions they acknowledge.

Figure 1E:
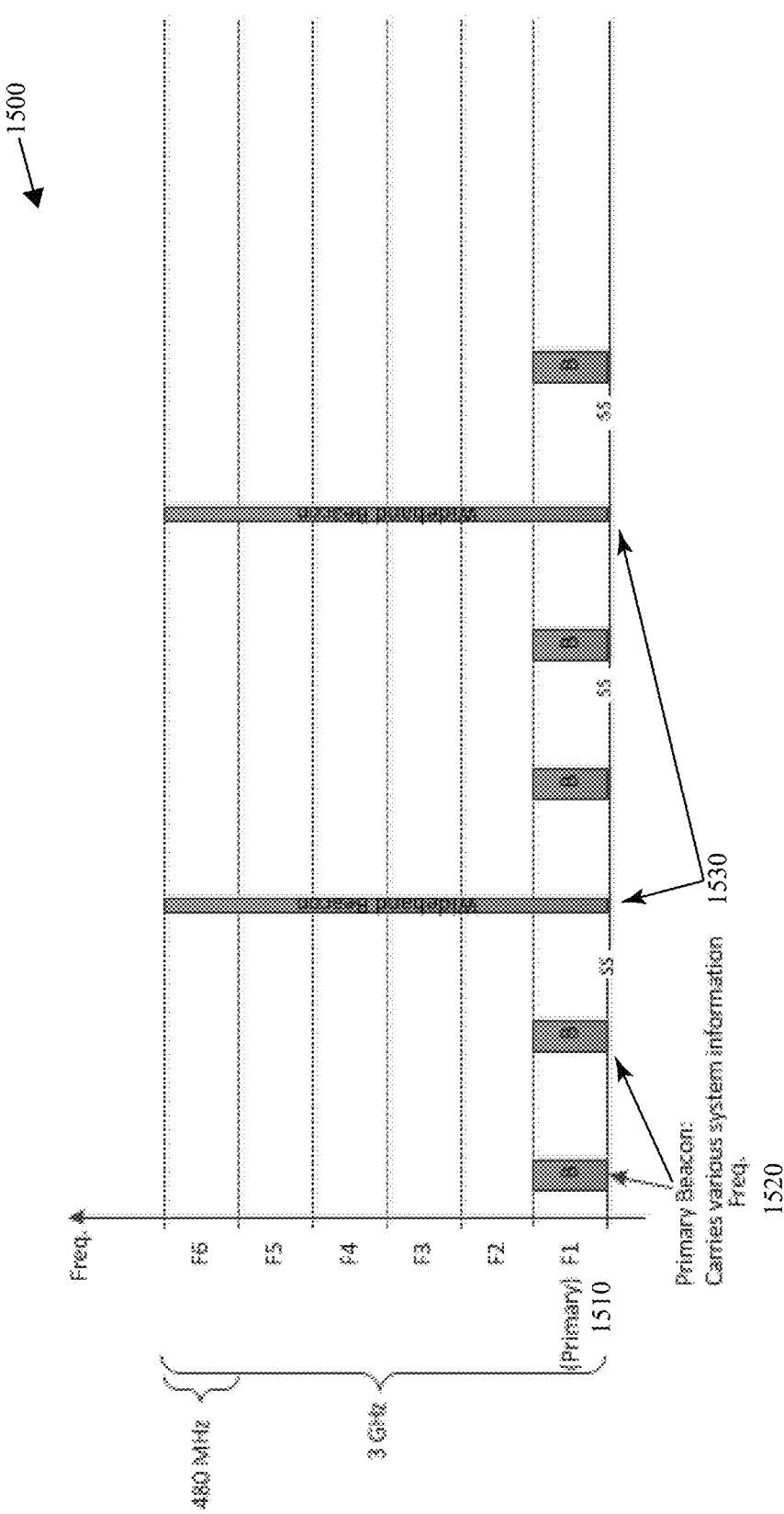
FIG. 1E depicts an embodiment of beacon frame transmissions on a primary channel interlaced with wideband beacon transmissions.

FIG. 1E depicts an embodiment 1500 of primary beacon frame transmissions 1520 on a primary channel 1510 interlaced with wideband beacon transmissions 1530. Note that the beacon transmissions are only on the primary channel to allow operation of different kinds of communications devices. It is assumed that compatible communications devices can operate at low or wide bandwidth, i.e., a low cost communications device may support only 480 MHz of bandwidth while a high end communications device may operate as wide as 3 GHz.

For this reason, a primary channel 1510 is defined on which the communications device 1010 broadcasts a beacon 1520. After, e.g., the communications device 1030 is associated to communications device 1010, the communications device 1030 can receive a command from the communications device 1010 to hop to another sub-channel, and to stay and operate on that sub-channel for a certain interval of time. In case the communications device 1030 enters a power save mode in a non-primary channel, the communications device 1010 may also broadcast a wideband beacon 1530 periodically.

The wideband beacon 1530 is a duplicated primary beacon 1520 transmitted on all sub-channels. The drawback of the wideband beacon 1530 is that it may be transmitted at a reduced maximum transmit power. However, if this is becomes an issue for the range of the system, then hopping logic 1013 of the communications device 1010 may determine to transmit beacons in all sub-channels sequentially instead of one wideband transmission as depicted in FIG. 1F.

Figure 1F:
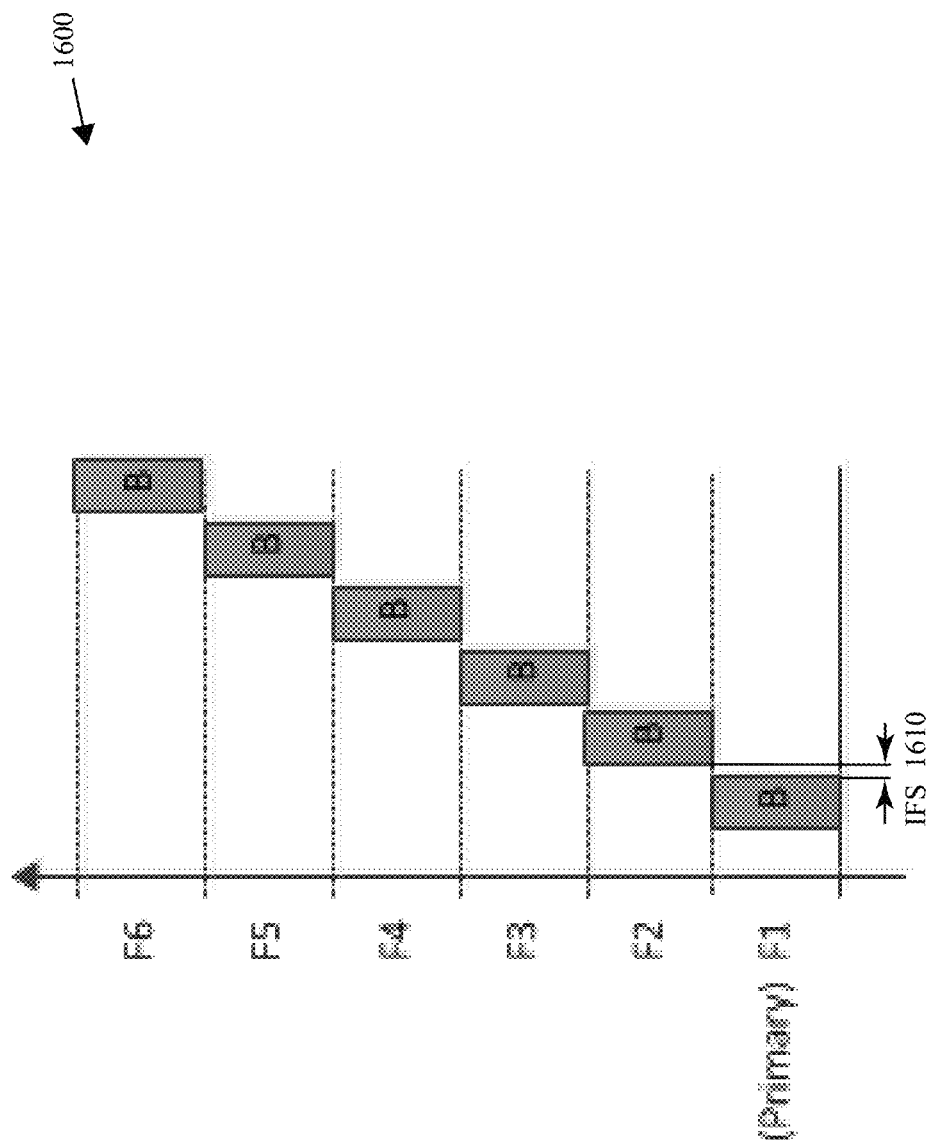
FIG. 1F depicts an embodiment of sequential beacon transmissions.

FIG. 1F depicts an embodiment 1600 of sequential beacon transmissions. In this embodiment, the sequential beacons are transmitted on channels F1-F6 in order and the beacons are separated by an interframe space (IFS) 1610. In other embodiments, the beacons may be transmitted sequentially in a different order of the channels. Furthermore, if an overlaying basic service set or other device were to interfere with the transmission of one of the beacons, there may be a much longer delay between one or more of the beacons.

Figure 1G:
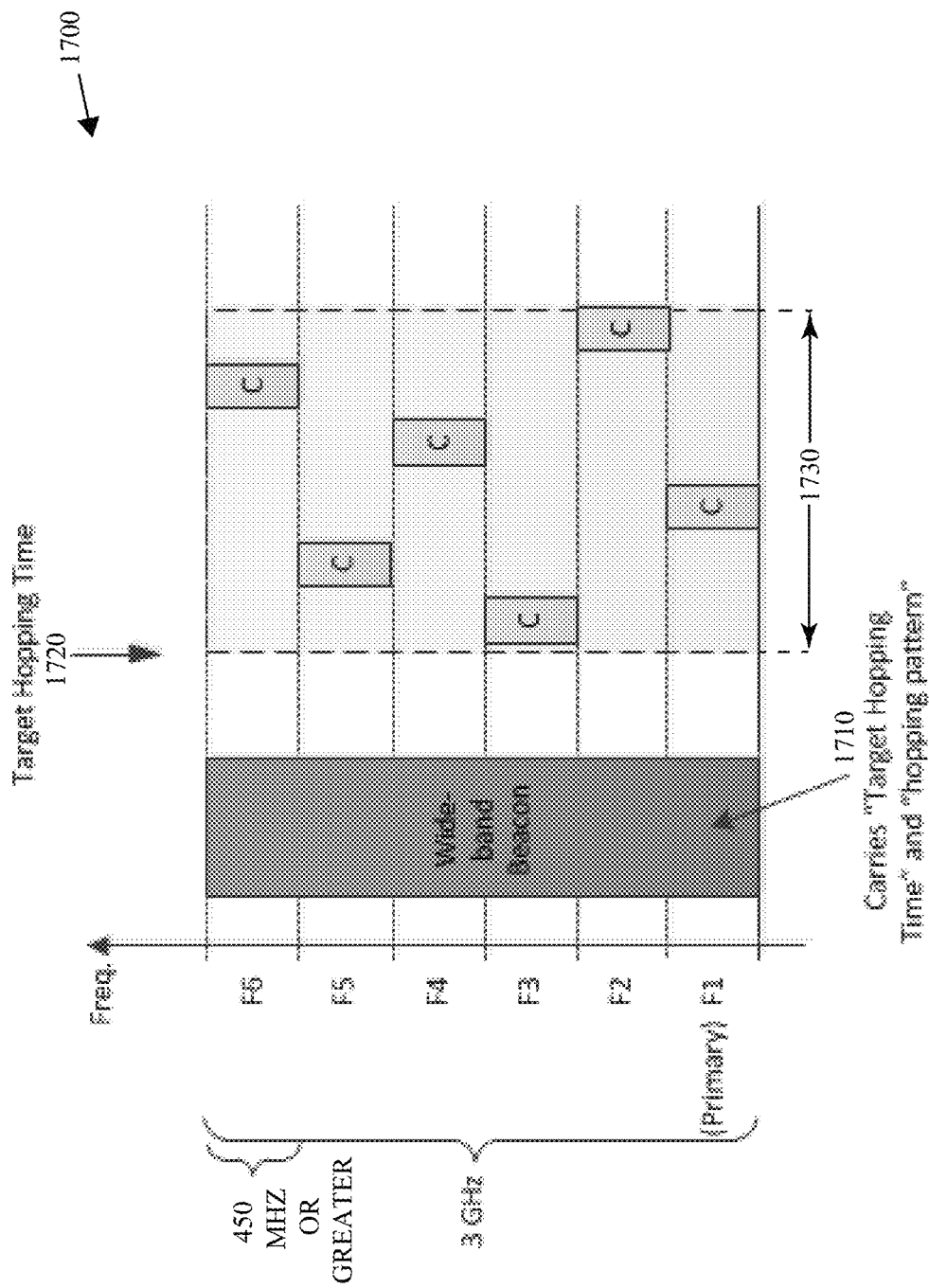
FIG. 1G depicts an embodiment of a wideband beacon transmission to transmit target hopping time and a hopping pattern followed by CTS-to-self or self-CTS transmissions to communicate a duration of a data transmission and reserve the sub-channels.

FIG. 1G depicts an embodiment 1700 of a wideband beacon 1710 transmission carrying a THT 1720 and a hopping pattern value followed by CTS-to-self or self-CTS transmissions 1730 in accordance with the corresponding hopping pattern to communicate a duration of a data transmission and reserve the sub-channels for the data transmission. After transmitting the beacon with the THT 1720, when THT arrives, the communications device 1010 will contend to gain access to the media and transmit CTS-to-self transmissions 1730 to reserve media for hopping transmission.

Figure 1H:
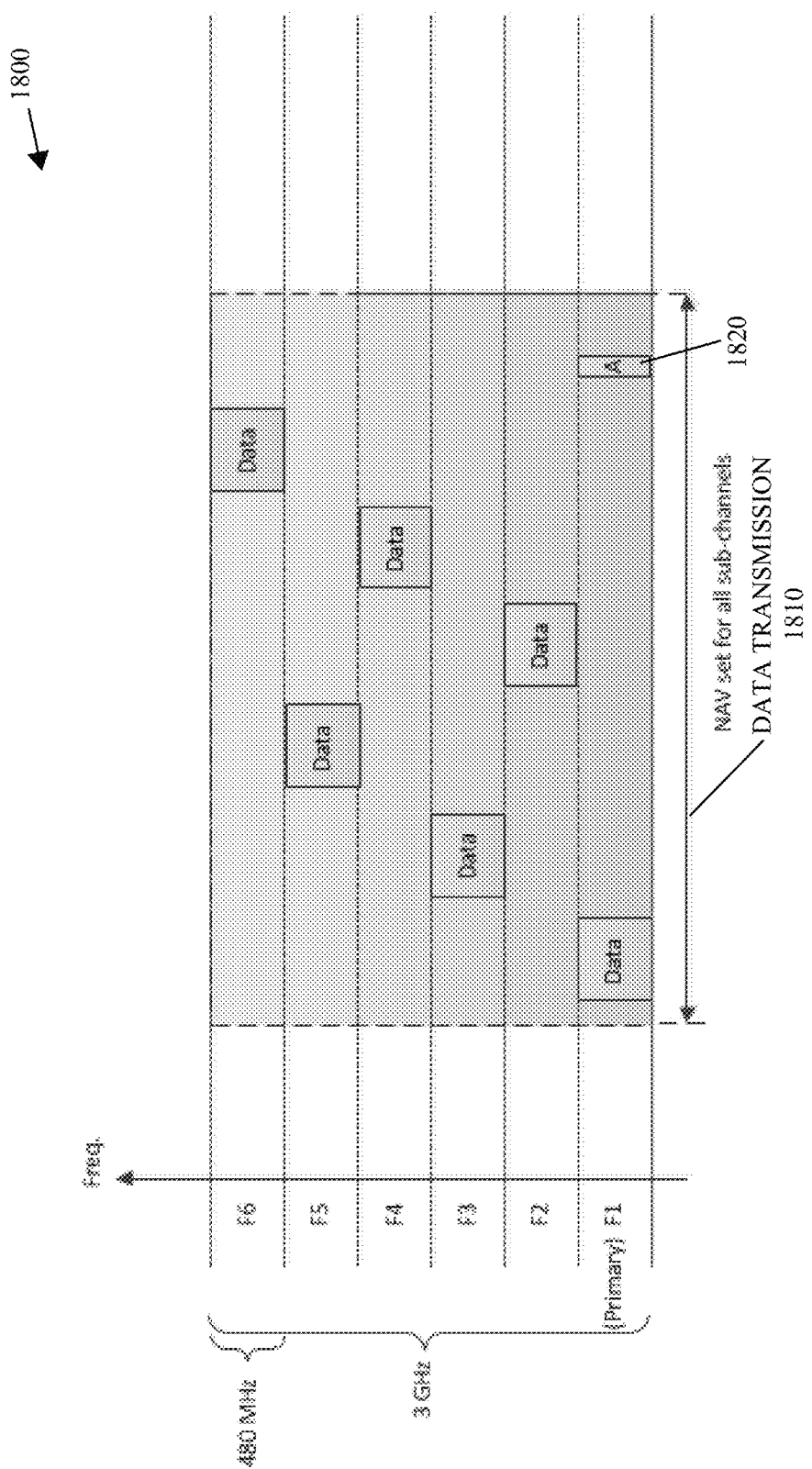
FIG. 1H depicts an embodiment of a data transmission with a block acknowledgement on the primary channel.
Figure 11:
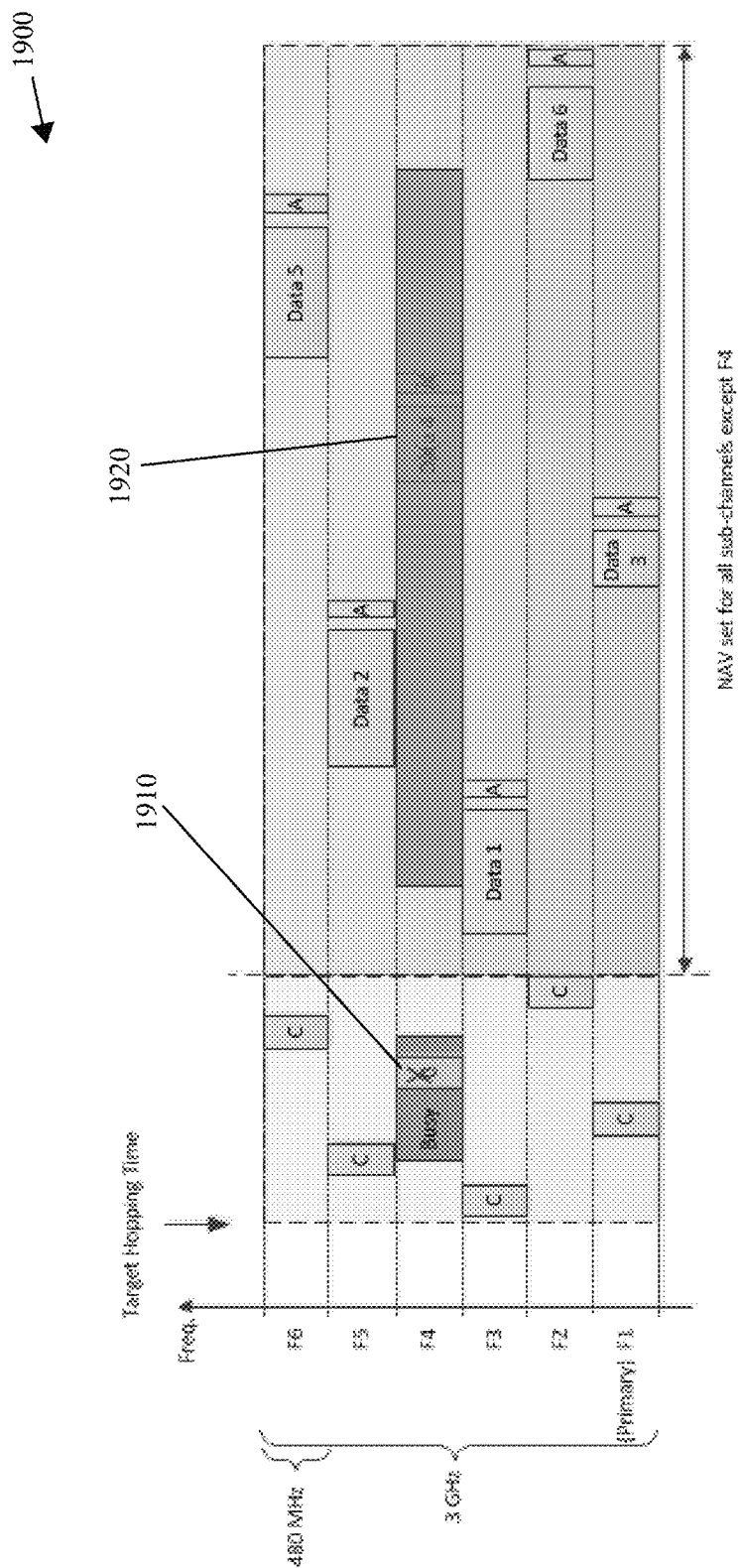

FIG. 1H depicts an embodiment 1800 of a data transmission 1810 with a block ACK on the primary channel 1820. In many embodiments, this data transmission follows a transmission of self-CTSs. In other embodiments, the data transmission 1810 follows an RTS/CTS exchange such as RTS's from a communications device 1030 and CTSs from the communications device 1050 that is receiving the data transmission 1810.

The block ACK 1820 may acknowledge all of the previously received data transmissions on the channels F1 through F6 and may be transmitted on the primary channel. In other embodiments, a delayed ACK can be sent sequentially in all sub-channels. In further embodiments, the delayed ACK may be transmitted sequentially in the order of the hopping pattern.

FIG. 1I depicts an embodiment 1900 of CTS transmissions followed by data transmissions on only five of the six contiguous sub-channels F1 through F3, F5, and F6 due to a busy sub-channel F4 during the CTS transmissions. Note that the channel F4 is busy for a threshold period of time during the CTS transmissions so the communications device 1010 may skip transmission of the CTS 1910 and then skips the data transmission 1920 on channel F4 during the data transmission phase. In some embodiments, the duration of the transmissions may be extended so that the data that would have been transmitted on the channel F4 is distributed amongst the other reserved channels. For example, the durations associated with the CTS's on channels F3, F5, and F1 may assume that all the channels would be used to transmit the data but after the busy determination on the channel F4, the hopping logic 1013 of the communications device 1010 may determine an updated duration for the CTS transmitted on channel F6 or on channel F2 to reflect the use of only five of the channels for transmission of the data.

Referring again to FIG. 1, the network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, the network 1005 communicatively couples communications devices 1010, 1030, 1050, and 1055.

The communication devices 1010 and 1030 comprise processor(s) 1001 and 1002, memory 1011 and 1031, and MAC sublayer logic 1018 and 1038, respectively. The processor(s) 1001 and 1002 may comprise any data processing device such as a microprocessor, a microcontroller, a state machine, and/or the like, and may execute instructions or code in the memory 1011 and 1031. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may be coupled with the MAC sublayer logic 1018, 1038 and/or may be coupled with the PHY layer device, transceiver 1020, 1040, respectively. In many embodiments, the memory 1011 and 1031 may store the frames and/or the frame structures, frame headers or portions thereof, and the memory 1011 and 1031 may store one or more hopping patterns with corresponding hopping pattern numbers. In many embodiments, the frames may comprise fields based upon the structure of the standard frame structures identified in IEEE 802.11. Note that the memory is shown as a block but may be part of any or all of the multiple different subcomponent in the communications devices 1010 and 1030. For instance, the memory may be part of or coupled with the PHY logic 1029 and 1039 and/or the MAC logic 1018 and 1038.

The MAC logic 1018 and 1038 may comprise logic to implement functionality of the MAC sublayer of the data link layer of the communications devices 1010 and 1030, respectively. The MAC logic 1018 and 1038 may generate the frames such as management frames, data frames, and control frames, and may communicate with the PHY logic 1029 and 1039, respectively. The PHY logic 1029 and 1039 may generate physical layer protocol data units (PPDUs) based upon the frames 1014 and 1034, respectively. More specifically, the frame builders may generate frames 1014 and 1034, pass the frames to the data builders, and the data unit builders of the PHY logic 1029 and 1039 may prepend the frames 1014 and 1034, respectively, with preambles to generate PPDUs for transmission via a physical layer (PHY) device such as the transceivers (RX/TX) 1020 and 1040, respectively.

The frame 1014, also referred to as MAC layer Service Data Units (MSDUs), may comprise, e.g., a management frame. For example, a frame builder may generate a management frame such as the beacon frame to identify the communications device 1010 as having capabilities such as supported hopping patterns, data rates, power saving features, cross-support, and a service set identification (SSID) of the network to identify the network to the communications device 1030. The MAC logic 1018 may convert the frame into a MAC protocol data unit (MPDU) and pass the frame to the PHY logic 1029 and the PHY logic 1029 may prepend a preamble to generate a PHY frame prior to transmitting the PHY frame.

The communications devices 1010, 1030, 1050, and 1055 may each comprise a transmitters and receivers such as transceivers (RX/TX) 1020 and 1040. In many embodiments, transceivers 1020 and 1040 implement orthogonal frequency-division multiplexing (OFDM) 1022 and 1042. OFDM 1022 and 1042 implements a method of encoding digital data on multiple carrier frequencies. OFDM 1022 and 1042 comprise a frequency-division multiplexing scheme used as a digital multi-carrier modulation method. A large number of closely spaced orthogonal subcarrier signals are used to carry data. The data is divided into several parallel data streams or channels, one for each subcarrier. Each subcarrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols in the front end of the transmitter during transmission to avoid inter-symbol interference (ISI), which might result from multi-path distortion.

Each transceiver 1020 and 1040 comprises a radio 1025 and 1045, respectively, comprising an RF transmitter and an RF receiver. The RF transmitter comprises an OFDM 1042, which impresses digital data, OFDM symbols encoded with tones, onto RF frequencies, also referred to as subcarriers, for transmission of the data by electromagnetic radiation. In the present embodiment, the OFDM 1042 may impress the digital data as OFDM symbols encoded with tones onto the subcarriers to for transmission. The OFDM 1042 may transform information signals into signals to be applied via the radio 1045 to elements of an antenna array 1044. An RF receiver receives electromagnetic energy at an RF frequency via antennas 1024 and radio 1025 and extracts the digital data from the OFDM symbols via OFDM 1022 in transceiver 1020.

In some embodiments, the communications device 1010 optionally comprises a Digital Beam Former (DBF) 1023, as indicated by the dashed lines. In some embodiments, the DBF 1023 may be part of the OFDM 1022. The DBF 1023 provides spatial filtering and is a signal processing technique used with antenna array 1024 for directional signal transmission or reception. This is achieved by combining elements in a phased antenna array 1024 in such a way that signals at particular angles experience constructive interference while others experience destructive interference. Beamforming can be used at both the transmitting and receiving ends in order to achieve spatial selectivity. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises the transceiver (RX/TX) 1040 to receive and transmit signals from and to the communications device 1010. The transceiver (RX/TX) 1040 may comprise an antenna array 1044 and, optionally, a DBF 1043. In other embodiments, the signals in the communications devices 1010 and 1030 may be beamformed via beamformers that are not digital.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

Figure 2:
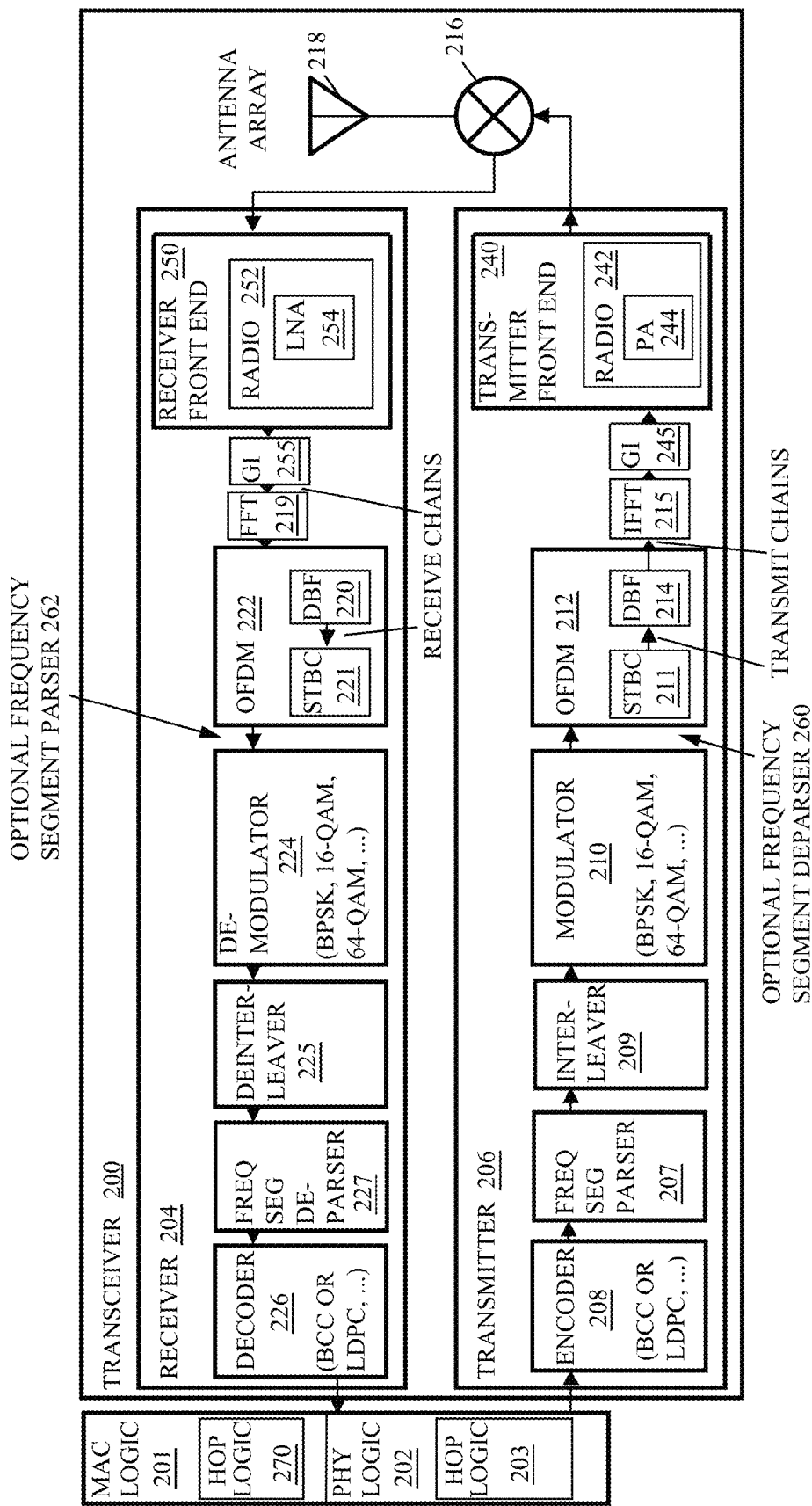
FIG. 2 depicts an embodiment of an apparatus to generate, transmit, receive, decode, and interpret large bandwidth communications.

FIG. 2 depicts an embodiment of an apparatus to generate, transmit, receive, and interpret or decode MAC frames. The apparatus comprises a transceiver 200 coupled with Medium Access Control (MAC) sublayer logic 201 and a physical layer (PHY) logic 202. The MAC logic 201 may determine a frame and the physical layer (PHY) logic 202 may determine the PPDU by prepending the frame or multiple frames with a preamble to transmit via transceiver 200. For example, a frame builder may generate a frame including a type field that specifies the type of the frame such as a management, control, or data frame. A control frame may include a Ready-To-Send or Clear-To-Send frame. A management frame may comprise a Beacon, Probe Request/Response, Association Request/Response, and Reassociation Request/Response frame type. And the data type frame is designed to transmit data.

In the present embodiment, the MAC logic 201 may comprise the hopping logic 270 to select a hopping pattern, determine a THT, determine a duration of the transmissions, determine an ACK policy, determine a threshold period for a busy channel, and the like to implement one or more different hopping patterns. In several embodiments, the hopping logic 270 may include logic to agree to and/or to negotiate a hopping pattern with another communications device. In some embodiments, the hopping logic 270 may receive an indication of a capability from another communications device and select a particular hopping pattern based upon one or more factors such as preference indicated for a particular hopping pattern if available, an indication of deployment type, an indication of traffic density on one or more particular channels, a preference presented by the other communications device, and/or the like.

The PHY logic 202 may also comprise the hopping logic 203. The hopping logic 203 may implement a pattern of channel hops per instruction from the MAC logic 201. In some embodiments, the transceiver 200 may either transmit contiguous transmissions or non-contiguous transmissions so the hopping logic 203 may only include the one that corresponds to the hardware configuration. In further embodiments, the transceiver 200 may be capable of both contiguous and non-contiguous transmissions and the hopping logic 203 in such embodiments may include hopping patterns for both contiguous and non-contiguous transmissions.

The transceiver 200 comprises a receiver 204 and a transmitter 206. The transmitter 206 may comprise one or more of an encoder 208, a frequency segment parser 207, an interleaver 209, a modulator 210, optionally a frequency segment deparser 260, an OFDM 212, an IFFT 215, a GI 245, and a transmitter front end 240. The encoder 208 of transmitter 206 receives and encodes a data stream destined for transmission from the MAC sublayer logic 202 with, e.g., a binary convolutional coding (BCC), a low density parity check coding (LDPC), and/or the like. The frequency segment parser 207 may receive data stream from encoder 208 and parse the data stream into two or more frequency segments to build a contiguous or non-contiguous bandwidth based upon building blocks of frequency segments that have smaller bandwidths. For instance, the frequency segment parser 207 may separate the data stream into three frequency segments including two frequency segments with 160 MHz bandwidths and one frequency segment with an 80 MHz bandwidth. The interleaver 209 may have three separate data processing paths to interleave the three frequency segments separately to prevent long sequences of adjacent noisy bits from entering a BCC decoder of a receiver.

The modulator 210 may receive the three data streams from interleaver 209 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 209 may be fed into the optional frequency segment deparser 260. In these embodiments, the transmitter 206 may be configured to transmit the, e.g., three frequency segments in a single, contiguous frequency bandwidth of, e.g., 400 MHz. Other embodiments may continue to process the three frequency segments as three separate data streams.

After the modulator 210, the data stream(s) are fed to an orthogonal frequency division multiplexing (OFDM) module 212. The OFDM module 212 may comprise a space-time block coding (STBC) module 211, and a digital beamforming (DBF) module 214. The STBC module 211 may receive constellation points from the modulator 209 corresponding to one or more spatial streams and may spread the spatial streams to a greater number of space-time streams (also generally referred to as data streams). Further embodiments may omit the STBC.

The OFDM module 212 impresses or maps the modulated data formed as OFDM symbols onto a plurality of orthogonal subcarriers so the OFDM symbols are encoded with the subcarriers or tones. In some embodiments, the OFDM symbols are fed to the Digital Beam Forming (DBF) module 214. Generally, digital beam forming uses digital signal processing algorithms that operate on the signals received by, and transmitted from, an array of antenna elements.

The Inverse Fast Fourier Transform (IFFT) module 215 may perform an inverse discrete Fourier transform (IDFT) on the OFDM symbols to map the subcarriers to each of the, e.g., three contiguous or non-contiguous frequency bandwidths. The output of the IFFT module 215 may enter the guard interval (GI) module 245. The GI module 245 may insert guard intervals by prepending to the symbol a circular extension of itself. In some embodiments, the GI module 245 may also comprise windowing to optionally smooth the edges of each symbol to increase spectral decay.

The output of the GI module 245 may enter the transmitter front end 240. The transmitter front end 240 may comprise a radio 242 with a power amplifier (PA) 244 to amplify the signal and prepare the signal for transmission via the antenna array 218.

In one embodiment, the radios 242 and 252 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radios 242 and 252 may include, for example, a receiver, a transmitter and/or a frequency synthesizer. The radios 242 and 252 may include, for instance, bias controls, and a crystal oscillator, and may couple with one or more antennas 218. In another embodiment, the radio 242 may use external voltage-controlled oscillators (VCOs), surface acoustic wave filters, intermediate frequency (IF) filters and/or RF filters, as desired. Due to the variety of potential RF interface designs an expansive description thereof is omitted.

The signal may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. In other embodiments, the transceiver 200 may comprise one or more antennas rather than antenna arrays and, in several embodiments, the receiver 204 and the transmitter 206 may comprise their own antennas or antenna arrays.

The transceiver 200 may comprise a receiver 204 for receiving, demodulating, and decoding information bearing communication signals. The receiver 204 may comprise a receiver front-end to detect the signal, detect the start of the packet, remove the carrier frequency, and amplify the subcarriers via a radio 252 with a low noise amplifier (LNA) 254. The receiver 204 may comprise a GI module 255 and a fast Fourier transform (FFT) module 219. The GI module 255 may remove the guard intervals and the windowing and the FFT module 219 may transform the communication signals from the time domain to the frequency domain.

The receiver 204 may also comprise an OFDM module 222, an optional frequency segment parser 262, a demodulator 224, a deinterleaver 225, a frequency segment deparser 227, and a decoder 226. An equalizer may output the weighted data signals for the OFDM packet to the OFDM module 222. The OFDM 222 extracts signal information as OFDM symbols from the plurality of subcarriers onto which information-bearing communication signals are modulated.

The OFDM module 222 may comprise a DBF module 220, and an STBC module 221. The received signals are fed from the equalizer to the DBF module 220. The DBF module 220 may comprise algorithms to process the received signals as a directional transmission directed toward to the receiver 204. And the STBC module 221 may transform the data streams from the space-time streams to spatial streams.

The output of the STBC module 221 may enter a frequency segment parser 262 if the communication signal is received as a single, contiguous bandwidth signal to parse the signal into, e.g., two or more frequency segments for demodulation and deinterleaving. On the other hand, if the communication is received as three separate bandwidth signals then the signals may be demodulated and deinterleaved prior to deparsing the signals.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TX-VECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. In many embodiments, the frequency segment deparser 227 may deparse the frequency segments as received if received as separate frequency segment signals, or may deparse the frequency segments determined by the optional frequency segment parser 262. The decoder 226 decodes the deparsed and deinterleaved data from the demodulator 224 and transmits the decoded information, the MPDU, to the MAC logic 201 via PHY logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC logic 201 may parse the MPDU based upon a format defined in the communications device for a frame to determine the particular type of frame by determining the type value and the subtype value. The MAC logic 201 may then parse and interpret the remainder of MPDU based upon the definition for the frame of the particular type and subtype indicated in the MAC header.

Figure 3A:
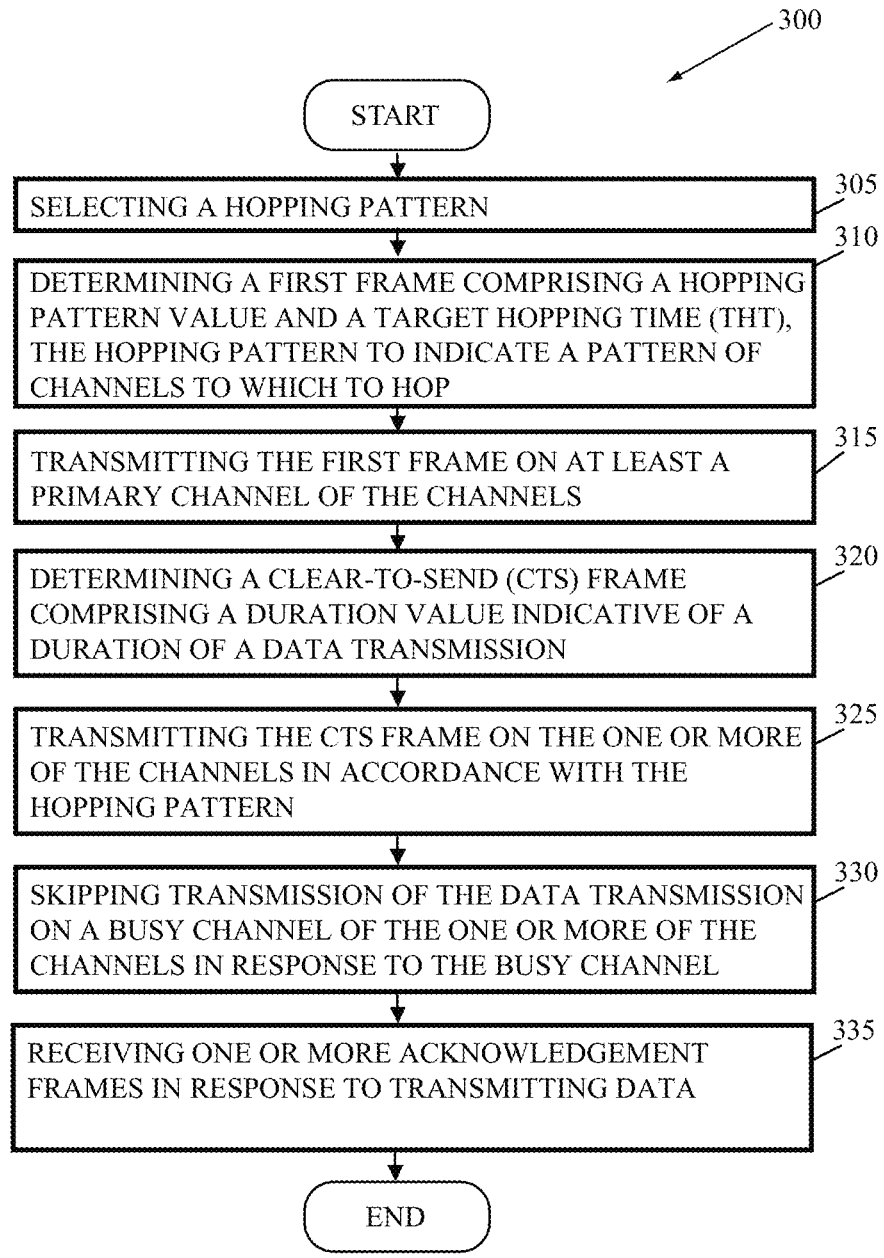
FIGS. 3A-B depict embodiments of flowcharts to transmit and receive frames in accordance with a hopping pattern.
Figure 3B:
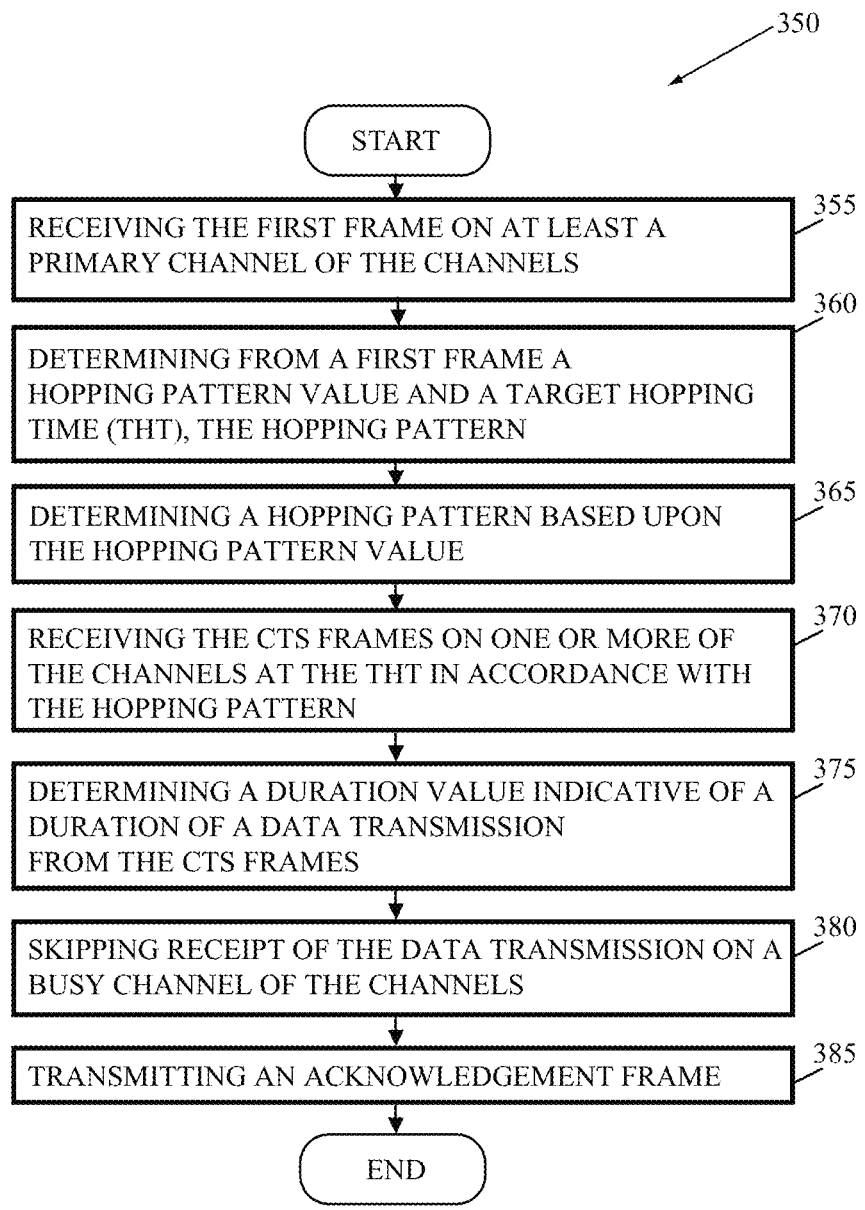

FIG. 3A-B depict embodiments of flowcharts to transmit and receive packets in accordance with a hopping pattern. In particular, FIG. 3A depicts an embodiment of a flowchart 300 to transmit data packets. The flowchart 300 begins with a medium access control (MAC) logic selecting a hopping pattern (element 305). In some embodiments, the MAC logic may interact with a receiver, determine a traffic density, determine a deployment preference, and/or the like to select a hopping pattern. In many embodiments, the MAC logic may select the hopping pattern from one or more predetermined hopping patterns included in memory that the PHY is capable of implementing. In many embodiments, the hopping pattern may represent a pattern of channels in a 6-gigahertz to 10-gigahertz frequency band to which to hop.

After determining the hopping pattern, the MAC logic may determine the frequency subband, or channel, on which to transmit a packet as the first frequency in the selected hopping pattern and may determine a first frame, such as a beacon frame for an AP or another management frame for a non-AP station, with the hopping pattern value and the target hopping time (THT) (element 310). In many embodiments, the hopping pattern may indicate the first frequency on which to start transmitting. Thereafter, the PHY device may transmit the first frame to a receiving station on at least the primary channel (element 315).

Some time after transmitting the frame with the hopping pattern value and the target hopping time (THT), the MAC logic may determine a control frame such as a self-CTS frame for an AP or an RTS frame for a non-AP station with a duration value that is indicative of the duration of a data transmission that will follow the transmission of the control frame (element 320). The PHY device may transmit the CTS or RTS on one or more of the channels in accordance with the hopping pattern (element 325). If one or more of the channels is busy for more than a threshold period of time, then the MAC logic may determine to skip the transmission of the data packets on one or more of the channels (element 330).

After transmitting one or more of the data packets, the MAC logic may receive one or more ACK frames in accordance with an ACK policy (element 335). For example, the PHY device may receive a block ACK on the primary channel, a delayed ACK on each of the channels after the end of all the data transmissions, or an immediate ACK on each of the channels an IFS after receiving the data transmission on the channel.

FIG. 3B depicts an embodiment of a flowchart 350 to receive data packets. The flowchart 300 begins with a medium access control (MAC) logic receiving a first frame on at least a primary channel (element 355) and determining a hopping pattern and THT based upon receipt of a first frame such as a beacon frame on a primary channel or via a wideband beacon frame transmitted on all of the channels (element 360). In many embodiments, the MAC logic may receive the hopping pattern in the form of a hopping pattern value and may look up the value in a table in memory such as a Table 1100 in FIG. 1A (element 365). In many embodiments, the hopping pattern may represent a pattern of 500 MHz channels including guard tones in a 6-gigahertz to 10-gigahertz frequency band to which to hop.

After determining the hopping pattern, the MAC logic may receive CTS frames on one or more of the channels at the THT in accordance with the hopping pattern (element 370). In many embodiments, the hopping pattern may indicate the first frequency on which to start receiving the CTS frames and there may be a predetermined time period between transmissions of the CTS's on the channels such as a SIFS.

The MAC logic may determine a duration associated with a data transmission to follow the CTS's by determining the duration value in a duration field of the last CTS received (element 375). If the MAC logic fails to receive one or more of the CTS frames on one or more of the channels, the MAC logic may, in accordance with a protocol, skip those channels during the process of frequency hopping to receive the data packets during the following data transmission (element 380). For example, the one or more channels may be busy and the MAC logic may not receive the CTS's because the CTS's were not transmitted. The MAC logic may comprise a threshold time period to wait to receive the CTS's on each of the channels and switch to the next channel after the threshold time period.

After receiving one or more of the data packets, the MAC logic may transmit one or more ACK frames in accordance with an ACK policy (element 385). For example, the MAC logic may transmit a block ACK on the primary channel after receipt of all the data packets in the data transmission, a delayed ACK on each of the channels after the end of all the data transmissions, or an immediate ACK on each of the channels a SIFS after receiving the data packet on the channel.

Figure 4A:
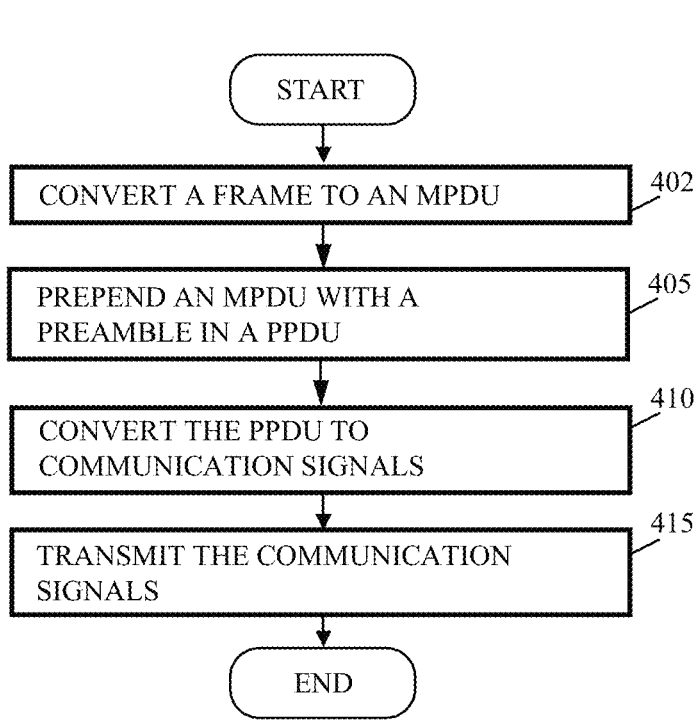
FIGS. 4A-B depict embodiments of flowcharts to transmit, receive, decode, and interpret communications with frames as illustrated in FIGS. 1-2.
Figure 4B:
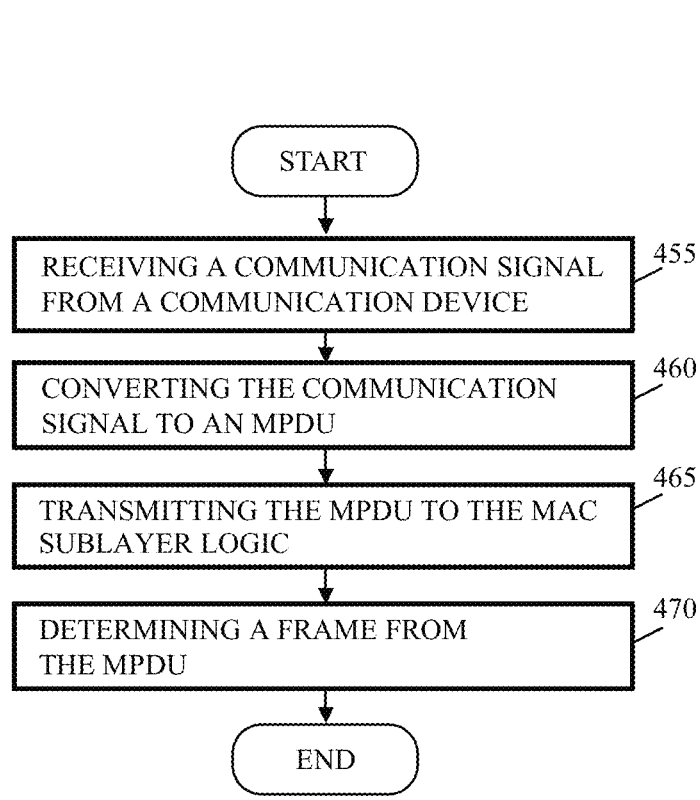

FIGS. 4A-B depict embodiments of flowcharts 400 and 450 to transmit, receive, and interpret communications with a frame. Referring to FIG. 4A, the flowchart 400 may begin with receiving a frame from the frame builder. The MAC sublayer logic of the communications device may select a channel on which to transmit a packet based upon a hopping pattern and may generate the frame as a management frame to transmit to a station and may convert the frame into a MAC protocol data unit (MPDU) (element 402) to pass to a data unit builder that transforms the data into a packet that can be transmitted to the station. The data unit builder may generate a preamble to prepend the PHY service data unit (PSDU) (the MPDU from the frame builder) to form a PHY protocol data unit (PPDU) for transmission (element 405). In some embodiments, more than one MPDU may be prepended in a PPDU.

The PPDU may then be transmitted to the physical layer device such as the transmitter 206 in FIG. 2 or the transceiver 1020, 1040 in FIG. 1 so the PPDU may be parsed into two or more frequency segments associated with contiguous or non-contiguous bandwidths and converted to communication signals (element 410). The transmitter may then transmit the communication signals via one or more antennas or an antenna array (element 415).

Referring to FIG. 4B, the flowchart 450 begins with a receiver of a station such as the receiver 204 in FIG. 2 receiving a communication signal via one or more antenna(s) such as an antenna element of antenna array 218 (element 455) on a channel indicated by a hopping pattern such as a hopping pattern in Table 1100 of FIG. 1A. The receiver may deparse the frequency segments of the communications signal and may convert the communication signal into an MPDU in accordance with the process described in the preamble (element 460). More specifically, the received signal is fed from the one or more antennas to a DBF such as the DBF 220. The DBF processes the signal with spatial selectivity based on the direction of receipt. The output of the DBF is fed to OFDM such as the OFDM 222. In some embodiments, the output may first be fed into a frequency parser to parse the communication signal into two or more frequency segments.

The OFDM may extract signal information from the plurality of subcarriers in each of the frequency segments onto which information-bearing, signals are modulated. Then, the demodulator such as the demodulator 224 demodulates the signal information via, e.g., BPSK, 16-QAM, 64-QAM, 256-QAM, QPSK, or SQPSK. The signal may be deinterleaved and the frequency segments may then be deparsed.

The decoder such as the decoder 226 may decode the signal information from the demodulator via, e.g., BCC or LDPC, to extract the MPDU (element 460) and transmit the MPDU to MAC sublayer logic such as MAC sublayer logic 202 (element 465).

The MAC sublayer logic may determine frame field values from the MPDU (element 470) the frame control field. For instance, the MAC sublayer logic may determine frame field values such as the ACK policy field value of the frame.

The following examples pertain to further embodiments. Further embodiments may include an apparatus to transmit frames. The apparatus may comprise a medium access control (MAC) logic to determine a first frame comprising a hopping pattern value and a target hopping time (THT), the hopping pattern value to indicate a hopping pattern of channels to which to hop; and to determine a clear-to-send (CTS) frame comprising a duration value indicative of a duration of a data transmission; and a physical layer (PHY) device coupled with the MAC logic to transmit the first frame on at least a primary channel of the channels; and to transmit the CTS frame on one or more of the channels in accordance with the hopping pattern, each channel having a bandwidth of at least 450 megahertz and being within in a 6 gigahertz to 10 gigahertz frequency band; prior to transmitting the data transmission on the one or more of the channels.

In some embodiments, the apparatus may further comprise a processor, a memory coupled with the processor, one or more radios as part of the physical layer device. In some embodiments, the apparatus may further comprise one or more antennas coupled with one or more of corresponding one of the one or more radios. In some embodiments, the medium access control logic comprises logic to transmit the first frame on the primary channel and on a wideband channel, the wideband channel comprising all the channels. In some embodiments, the medium access control logic comprises logic to transmit the first frame on each of the channels sequentially. In some embodiments, the medium access control logic comprises logic to generate each of the CTS frames with an updated duration for the data transmission, the last CTS frame having the actual duration. In some embodiments, the medium access control logic comprises logic to skip transmission of the data transmission on a busy channel of the one or more of the channels in response to the busy channel being busy during an attempt to transmit the CTS frame on the busy channel. In some embodiments, the medium access control logic comprises logic to receive immediate acknowledgement frames on each of the one or more of the channels in response to transmitting data frames of the data transmission on each of the one or more of the channels. In some embodiments, the medium access control logic comprises logic to receive a block acknowledgement frame on the primary channel to acknowledge receipt of data frames of the data transmission on each of the one or more of the channels.

Another embodiment comprises a method to transmit packets. The method may comprise determining a first frame comprising a hopping pattern value and a target hopping time (THT), the hopping pattern value to indicate a hopping pattern of channels to which to hop; transmitting the first frame on at least a primary channel of the channels; determining a clear-to-send (CTS) frame comprising a duration value indicative of a duration of a data transmission; and transmitting the CTS frame, prior to transmitting the data transmission on one or more of the channels, in accordance with the hopping pattern, each channel having a bandwidth of at least 450 megahertz and being within in a 6 gigahertz to 10 gigahertz frequency band.

In some embodiments, the method may further comprise skipping transmission of the data transmission on a busy channel of the one or more of the channels in response to the busy channel being busy during an attempt to transmit the CTS frame on the busy channel. In some embodiments, the method may further comprise receiving immediate acknowledgement frames on each of the one or more of the channels in response to transmitting data frames of the data transmission on each of the one or more of the channels. In some embodiments, the method may further comprise receiving a block acknowledgement frame on the primary channel to acknowledge receipt of data frames of the data transmission on each of the one or more of the channels. In some embodiments, transmitting the first frame on at least a primary channel of the channels comprises transmitting the first frame on the primary channel and on a wideband channel, the wideband channel comprising all the channels. In some embodiments, transmitting the first frame on at least a primary channel of the channels comprises transmitting the first frame on each of the channels sequentially. In some embodiments, determining a clear-to-send (CTS) frame comprises generating each of the CTS frames with an updated duration for the data transmission, the last CTS frame having the actual duration.

Another embodiment comprises one or more tangible computer-readable non-transitory storage media comprising computer-executable instructions operable to, when executed by at least one computer processor, enable the at least one computer processor to implement a method comprising: determining a first frame comprising a hopping pattern value and a target hopping time (THT), the hopping pattern value to indicate a hopping pattern of channels to which to hop; transmitting the first frame on at least a primary channel of the channels; determining a clear-to-send (CTS) frame comprising a duration value indicative of a duration of a data transmission; and transmitting the CTS frame, prior to transmitting the data transmission on one or more of the channels, in accordance with the hopping pattern, each channel having a bandwidth of at least 450 megahertz and being within in a 6 gigahertz to 10 gigahertz frequency band.

In some embodiments, the method further comprises skipping transmission of the data transmission on a busy channel of the one or more of the channels in response to the busy channel being busy during an attempt to transmit the CTS frame on the busy channel. In some embodiments, the method further comprises receiving immediate acknowledgement frames on each of the one or more of the channels in response to transmitting data frames of the data transmission on each of the one or more of the channels. In some embodiments, the method further comprises receiving a block acknowledgement frame on the primary channel to acknowledge receipt of data frames of the data transmission on each of the one or more of the channels. In some embodiments, transmitting the first frame on at least a primary channel of the channels comprises transmitting the first frame on the primary channel and on a wideband channel, the wideband channel comprising all the channels. In some embodiments, transmitting the first frame on at least a primary channel of the channels comprises transmitting the first frame on each of the channels sequentially. In some embodiments, determining a clear-to-send (CTS) frame comprises generating each of the CTS frames with an updated duration for the data transmission, the last CTS frame having the actual duration.

Another embodiment comprises an apparatus to receive frames. The apparatus may comprise a medium access control logic to determine from a first frame a hopping pattern value and a target hopping time (THT), the hopping pattern value to indicate a hopping pattern of channels to which to hop; to determine a hopping pattern based upon the hopping pattern value; and to determine a duration value indicative of a duration of a data transmission; and a physical layer device coupled with the MAC logic to receive the first frame on at least a primary channel of the channels; and to receive the CTS frames at the THT on one or more of the channels in accordance with the hopping pattern, each channel having a bandwidth of at least 450 megahertz and being within in a 6 gigahertz to 10 gigahertz frequency band; prior to receiving the data transmission on the one or more channels in accordance with the hopping pattern.

In some embodiments, the apparatus may further comprise a processor, a memory coupled with the processor, one or more radios as part of the physical layer device. In some embodiments, the apparatus may further comprise one or more antennas coupled with one or more of corresponding one of the one or more radios. In some embodiments, the physical layer device is configured to receive the first frame on the primary channel and on a wideband channel, the wideband channel comprising all the channels. In some embodiments, the physical layer device is configured to receive the first frame on each of the channels sequentially. In some embodiments, the physical layer device is configured to skip receipt of the data transmission on a busy channel of the channels in response to the busy channel being busy during an attempt to receive the CTS frame on the busy channel. In some embodiments, MAC logic comprises logic to transmit immediate acknowledgement frames on each of the channels in response to receipt of data frames of the data transmission on each of the one or more of the channels. In some embodiments, MAC logic comprises logic to transmit a block acknowledgement frame on the primary channel to acknowledge receipt of data frames of the data transmission on each of the one or more of the channels.

Another embodiment comprises a method to receive frames. The method may comprise receiving the first frame on at least a primary channel of the channels; determining from a first frame a hopping pattern value and a target hopping time (THT), the hopping pattern value to indicate a hopping pattern of channels to which to hop; determining a hopping pattern based upon the hopping pattern value; receiving the CTS frames on one or more of the channels at the THT in accordance with the hopping pattern, each channel having a bandwidth of at least 450 megahertz and being within in a 6 gigahertz to 10 gigahertz frequency band; and determining a duration value indicative of a duration/of a data transmission prior to receiving the data transmission on the one or more channels in accordance with the hopping pattern.

In some embodiments, the method may further comprise skipping receipt of the data transmission on a busy channel of the channels in response to the busy channel being busy during an attempt to receive the CTS frame on the busy channel. In some embodiments, the method may further comprise transmitting immediate acknowledgement frames on each of the channels in response to receipt of data frames of the data transmission on each of the one or more of the channels. In some embodiments, the method may further comprise transmitting a block acknowledgement frame on the primary channel to acknowledge receipt of data frames of the data transmission on each of the one or more of the channels. In some embodiments, receiving the first frame on at least a primary channel of the channels comprises receiving the first frame on the primary channel and on a wideband channel, the wideband channel comprising all the channels. In some embodiments, receiving the first frame on at least a primary channel of the channels comprises receiving the first frame on each of the channels sequentially.

Another embodiment comprises one or more tangible computer-readable non-transitory storage media comprising computer-executable instructions operable to, when executed by at least one computer processor, enable the at least one computer processor to implement a method comprising: receiving the first frame on at least a primary channel of the channels; determining from a first frame a hopping pattern value and a target hopping time (THT), the hopping pattern value to indicate a hopping pattern of channels to which to hop; determining a hopping pattern based upon the hopping pattern value; receiving the CTS frames on one or more of the channels at the THT in accordance with the hopping pattern, each channel having a bandwidth of at least 450 megahertz and being within in a 6 gigahertz to 10 gigahertz frequency band; and determining a duration value indicative of a duration of a data transmission prior to receiving the data transmission on the one or more channels in accordance with the hopping pattern.

In some embodiments, the storage media may further comprise skipping receipt of the data transmission on a busy channel of the channels in response to the busy channel being busy during an attempt to receive the CTS frame on the busy channel. In some embodiments, the storage media may further comprise transmitting immediate acknowledgement frames on each of the channels in response to receipt of data frames of the data transmission on each of the one or more of the channels. In some embodiments, the storage media may further comprise transmitting a block acknowledgement frame on the primary channel to acknowledge receipt of data frames of the data transmission on each of, the one or more of the channels. In some embodiments, receiving the first frame on at least a primary channel of the channels comprises receiving the first frame on the primary channel and on a wideband channel, the wideband channel comprising all the channels. In some embodiments, receiving the first frame on at least a primary channel of the channels comprises receiving the first frame on each of the channels sequentially.

Another embodiment comprises a system to transmit packets. The system may comprise a processor; a memory coupled with the processor; a medium access control (MAC) logic to determine a first frame comprising a hopping pattern value and a target hopping time (THT), the hopping pattern value to indicate a hopping pattern of channels to which to hop; and to determine a clear-to-send (CTS) frame comprising a duration value indicative of a duration of a data transmission; and a physical layer (PHY) device coupled with the MAC logic to transmit the first frame on at least a primary channel of the channels; and to transmit the CTS frame on one or more of the channels in accordance with the hopping pattern, each channel having a bandwidth of at least 450 megahertz and being within in a 6 gigahertz to 10 gigahertz frequency band; prior to transmitting the data transmission on the one or more of the channels; and the PHY device comprising one or more radios.

In some embodiments, the system may further comprise one or more antennas coupled with one or more of corresponding ones of the one or more radios. In some embodiments, the medium access control logic comprises logic to transmit the first frame on the primary channel and on a wideband channel, the wideband channel comprising all the channels. In some embodiments, the medium access control logic comprises logic to transmit the first frame on each of the channels sequentially. In some embodiments, the medium access control logic comprises logic to generate each of the CTS frames with an updated duration for the data transmission, the last CTS frame having the actual duration. In some embodiments, the medium access control logic comprises logic to skip transmission of the data transmission on a busy channel of the one or more of the channels in response to the busy channel being busy during an attempt to transmit the CTS frame on the busy channel. In some embodiments, the medium access control logic comprises logic to receive immediate acknowledgement frames on each of the one or more of the channels in response to transmitting data frames of the data transmission on each of the one or more of the channels. In some embodiments, the medium access control logic comprises logic to receive a block acknowledgement frame on the primary channel to acknowledge receipt of data frames of the data transmission on each of the one or more of the channels.

Another embodiment comprises a system to receive frames. The system may comprise a processor; a memory coupled with the processor; a medium access control (MAC) logic to determine from a first frame a hopping pattern value and a target hopping time (THT), the hopping pattern value to indicate a hopping pattern of channels to which to hop; to determine a hopping pattern based upon the hopping pattern value; and to determine a duration value indicative of a duration of a data transmission; and a physical layer (PHY) device coupled with the MAC logic to receive the first frame on at least a primary channel of the channels; and to receive the CTS frames at the THT on one or more of the channels in accordance with the hopping pattern, each channel having a bandwidth of at least 450 megahertz and being within in a 6 gigahertz to 10 gigahertz frequency band; prior to receiving the data transmission on the one or more channels in accordance with the hopping pattern; and the PHY device comprising one or more radios.

In some embodiments, the system may further comprise one or more antennas coupled with one or more of corresponding one of the one or more radios. In some embodiments, the PHY device is configured to receive the first frame on the primary channel and on a wideband channel, the wideband channel comprising all the channels. In some embodiments, the PHY device is configured to receive the first frame on each of the channels sequentially. In some embodiments, the PHY device is configured to skip receipt of the data transmission on a busy channel of the channels in response to the busy channel being busy during an attempt to receive the CTS frame on the busy channel. In some embodiments, MAC logic comprises logic to transmit immediate acknowledgement frames on each of the channels in response to receipt of data frames of the data transmission on each of the one or more of the channels. In some embodiments, MAC logic comprises logic to transmit a block acknowledgement frame on the primary channel to acknowledge receipt of data frames of the data transmission on each of the one or more of the channels.

Another embodiment comprises an apparatus to transmit packets. The apparatus may comprise a means for determining a first frame comprising a hopping pattern value and a target hopping time (THT), the hopping pattern value to indicate a hopping pattern of channels to which to hop; a means for transmitting the first frame on at least a primary channel of the channels; a means for determining a clear-to-send (CTS) frame comprising a duration value indicative of a duration of a data transmission; and a means for transmitting the CTS frame, prior to transmitting the data transmission on one or more of the channels, in accordance with the hopping pattern, each channel having a bandwidth of at least 450 megahertz and being within in a 6 gigahertz to 10 gigahertz frequency band.

In some embodiments, the apparatus may further comprise a processor, a memory coupled with the processor, one or more radios as part of the means for transmitting the CTS frame. In some embodiments, the apparatus may further comprise one or more antennas coupled with one or more of corresponding one of the one or more radios. In some embodiments, the apparatus may further comprise a means for skipping transmission of the data transmission on a busy channel of the one or more of the channels in response to the busy channel being busy during an attempt to transmit the CTS frame on the busy channel. In some embodiments, the apparatus may further comprise a means for receiving immediate acknowledgement frames on each of the one or more of the channels in response to transmitting data frames of the data transmission on each of the one or more of the channels. In some embodiments, the apparatus may further comprise a means for receiving a block acknowledgement frame on the primary channel to acknowledge receipt of data frames of the data transmission on each of the one or more of the channels. In some embodiments, the means for transmitting the first frame on at least a primary channel of the channels comprises a means for transmitting the first frame on the primary channel and on a wideband channel, the wideband channel comprising all the channels. In some embodiments, the means for transmitting the first frame on at least a primary channel of the channels comprises a means for transmitting the first frame on each of the channels sequentially. In some embodiments, the means for determining a clear-to-send (CTS) frame comprises a means for generating each of the CTS frames with an updated duration for the data transmission, the last CTS frame having the actual duration.

Another embodiment comprises an apparatus to transmit packets. The apparatus may comprise a means for receiving the first frame on at least a primary channel of the channels; a means for determining from a first frame a hopping pattern value and a target hopping time (THT), the hopping pattern value to indicate a hopping pattern of channels to which to hop; a means for determining a hopping pattern based upon the hopping pattern value; a means for receiving the CTS frames on one or more of the channels at the THT in accordance with the hopping pattern, each channel having a bandwidth of at least 450 megahertz and being within in a 6 gigahertz to 10 gigahertz frequency band; and a means for determining a duration value indicative of a duration of a data transmission prior to receiving the data transmission on the one or more channels in accordance with the hopping pattern.

In some embodiments, the apparatus may further comprise a processor, a memory coupled with the processor, one or more radios as part of the means for receiving the CTS frames. In some embodiments, the apparatus may further comprise one or more antennas coupled with one or more of corresponding one of the one or more radios. In some embodiments, the apparatus may further comprise a means for skipping receipt of the data transmission on a busy channel of the channels in response to the busy channel being busy during an attempt to receive the CTS frame on the busy channel. In some embodiments, the apparatus may further comprise a means for transmitting immediate acknowledgement frames on each of the channels in response to receipt of data frames of the data transmission on each of the one or more of the channels. In some embodiments, the apparatus may further comprise a means for transmitting a block acknowledgement frame on the primary channel to acknowledge receipt of data frames of the data transmission on each of the one or more of the channels. In some embodiments, the means for receiving the first frame on at least a primary channel of the channels comprises a means for receiving the first frame on the primary channel and on a wideband channel, the wideband channel comprising all the channels. In some embodiments, the means for receiving the first frame on at feast a primary channel of the channels comprises a means for receiving the first frame on each of the channels sequentially.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. An apparatus to transmit frames, the apparatus comprising:
    a medium access control (MAC) logic to determine a first frame comprising a hopping pattern value and a target hopping time (THT), the hopping pattern value to indicate a hopping pattern of channels to which to hop; and to determine a clear-to-send (CTS) frame comprising a duration value indicative of a duration of a data transmission; and
    a physical layer (PHY) device coupled with the MAC logic to transmit the first frame on at least a primary channel of the channels; and to transmit the CTS frame on one or more of the channels in accordance with the hopping pattern, each channel having a bandwidth of at least 450 megahertz and being within in a 6 gigahertz to 10 gigahertz frequency band; prior to transmitting the data transmission on the one or more of the channels.

2. The apparatus of claim 1, further comprising a processor, a memory coupled with the processor, one or more radios as part of the physical layer device.

3. The apparatus of claim 1, further comprising one or more antennas coupled with one or more of corresponding one of the one or more radios.

4. The apparatus of claim 1, wherein the medium access control logic comprises logic to transmit the first frame on the primary channel and on a wideband channel, the wideband channel comprising all the channels.

5. The apparatus of claim 1, wherein the medium access control logic comprises logic to transmit the first frame on each of the channels sequentially.

6. The apparatus of claim 1, wherein the medium access control logic comprises logic to generate each of the CTS frames with an updated duration for the data transmission, the last CTS frame having the actual duration.

7. The apparatus of claim 1, wherein the medium access control logic comprises logic to skip transmission of the data transmission on a busy channel of the one or more of the channels in response to the busy channel being busy during an attempt to transmit the CTS frame on the busy channel.

8. The apparatus of claim 1, wherein the medium access control logic comprises logic to receive immediate acknowledgement frames on each of the one or more of the channels in response to transmitting data frames of the data transmission on each of the one or more of the channels.

9. The apparatus of claim 1, wherein the medium access control logic comprises logic to receive a block acknowledgement frame on the primary channel to acknowledge receipt of data frames of the data transmission on each of the one or more of the channels.

10. A method to transmit packets, the method comprising:
determining a first frame comprising a hopping pattern value and a target hopping time (THT), the hopping pattern value to indicate a hopping pattern of channels to which to hop;
transmitting the first frame on at least a primary channel of the channels;
determining a clear-to-send (CTS) frame comprising a duration value indicative of a duration of a data transmission; and
transmitting the CTS frame, prior to transmitting the data transmission on one or more of the channels, in accordance with the hopping pattern, each channel having a bandwidth of at least 450 megahertz and being within in a 6 gigahertz to 10 gigahertz frequency band.

11. The method of claim 10, further comprising receiving a block acknowledgement frame on the primary channel to acknowledge receipt of data frames of the data transmission on each of the one or more of the channels.

12. One or more tangible computer-readable non-transitory storage media comprising computer-executable instructions operable to, when executed by at least one computer processor, enable the at least one computer processor to implement a method comprising:
determining a first frame comprising a hopping pattern value and a target hopping time (THT), the hopping pattern value to indicate a hopping pattern of channels to which to hop;
transmitting the first frame on at least a primary channel of the channels;
determining a clear-to-send (CTS) frame comprising a duration value indicative of a duration of a data transmission; and
transmitting the CTS frame, prior to transmitting the data transmission on one or more of the channels, in accordance with the hopping pattern, each channel having a bandwidth of at least 450 megahertz and being within in a 6 gigahertz to 10 gigahertz frequency band.

13. The storage media of claim 12, wherein the method further comprises skipping transmission of the data transmission on a busy channel of the one or more of the channels in response to the busy channel being busy during an attempt to transmit the CTS frame on the busy channel.

14. An apparatus to receive frames, the apparatus comprising:
a medium access control logic to determine from a first frame a hopping pattern value and a target hopping time (THT), the hopping pattern value to indicate a hopping pattern of channels to which to hop; to determine a hopping pattern based upon the hopping pattern value; and to determine a duration value indicative of a duration of a data transmission; and
a physical layer device coupled with the MAC logic to receive the first frame on at least a primary channel of the channels; and to receive the CTS frames at the THT on one or more of the channels in accordance with the hopping pattern, each channel having a bandwidth of at least 450 megahertz and being within in a 6 gigahertz to 10 gigahertz frequency band; prior to receiving the data transmission on the one or more channels in accordance with the hopping pattern.

15. The apparatus of claim 14, further comprising a processor, a memory coupled with the processor, one or more radios as part of the physical layer device.

16. The apparatus of claim 14, further comprising one or more antennas coupled with one or more of corresponding one of the one or more radios.

17. The apparatus of claim 14, wherein the physical layer device is configured to receive the first frame on the primary channel and on a wideband channel, the wideband channel comprising all the channels.

18. The apparatus of claim 14, wherein the physical layer device is configured to receive the first frame on each of the channels sequentially.

19. The apparatus of claim 14, wherein the physical layer device is configured to skip receipt of the data transmission on a busy channel of the channels in response to the busy channel being busy during an attempt to receive the CTS frame on the busy channel.

20. The apparatus of claim 14, wherein MAC logic comprises logic to transmit immediate acknowledgement frames on each of the channels in response to receipt of data frames of the data transmission on each of the one or more of the channels.

21. The apparatus of claim 14, wherein MAC logic comprises logic to transmit a block acknowledgement frame on the primary channel to acknowledge receipt of data frames of the data transmission on each of the one or more of the channels.

22. A method to receive frames, the method comprising:
receiving the first frame on at least a primary channel of the channels;
determining from a first frame a hopping pattern value and a target hopping time (THT), the hopping pattern value to indicate a hopping pattern of channels to which to hop;
determining a hopping pattern based upon the hopping pattern value;
receiving the CTS frames on one or more of the channels at the THT in accordance with the hopping pattern, each channel having a bandwidth of at least 450 megahertz and being within in a 6 gigahertz to 10 gigahertz frequency band; and
determining a duration value indicative of a duration of a data transmission prior to receiving the data transmission on the one or more channels in accordance with the hopping pattern.

23. The method of claim 22, further comprising transmitting a block acknowledgement frame on the primary channel to acknowledge receipt of data frames of the data transmission on each of the one or more of the channels.

24. One or more tangible computer-readable non-transitory storage media comprising computer-executable instructions operable to, when executed by at least one computer processor, enable the at least one computer processor to implement a method comprising:
- receiving the first frame on at least a primary channel of the channels;
- determining from a first frame a hopping pattern value and a target hopping time (THT), the hopping pattern value to indicate a hopping pattern of channels to which to hop;
- determining a hopping pattern based upon the hopping pattern value;
- receiving the CTS frames on one or more of the channels at the THT in accordance with the hopping pattern, each channel having a bandwidth of at least 450 megahertz and being within in a 6 gigahertz to 10 gigahertz frequency band; and
- determining a duration value indicative of a duration of a data transmission prior to receiving the data transmission on the one or more channels in accordance with the hopping pattern.

25. The storage media of claim 24, wherein further comprising skipping receipt of the data transmission on a busy channel of the channels in response to the busy channel being busy during an attempt to receive the CTS frame on the busy channel.

* * * * *